(12) United States Patent
Cavalcanti et al.

(10) Patent No.: US 10,805,395 B2
(45) Date of Patent: Oct. 13, 2020

(54) ENHANCED PROXIMITY SERVICES (PROSE) PROTOCOLS FOR VEHICLE-TO-ANYTHING (V2X) COMMUNICATION

(71) Applicant: Intel Corporation, Santa Clara, CA (US)

(72) Inventors: Dave Cavalcanti, Beaverton, OR (US); Ana Lucia Pinheiro, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/577,293

(22) PCT Filed: Dec. 24, 2015

(86) PCT No.: PCT/US2015/000360
§ 371 (c)(1),
(2) Date: Nov. 27, 2017

(87) PCT Pub. No.: WO2016/209197
PCT Pub. Date: Dec. 29, 2016

(65) Prior Publication Data
US 2018/0159935 A1   Jun. 7, 2018

Related U.S. Application Data

(60) Provisional application No. 62/184,156, filed on Jun. 24, 2015.

(51) Int. Cl.
*H04L 29/08* (2006.01)
*H04W 4/40* (2018.01)
(Continued)

(52) U.S. Cl.
CPC .............. *H04L 67/12* (2013.01); *H04W 4/40* (2018.02); *H04W 4/44* (2018.02); *H04W 4/80* (2018.02);
(Continued)

(58) Field of Classification Search
CPC .... H04L 67/12; H04L 67/16; H04W 28/0268; H04W 4/046; H04W 4/44; H04W 4/46;
(Continued)

(56) References Cited

U.S. PATENT DOCUMENTS

| 2011/0051694 A1* | 3/2011 | Cho | H04W 72/0413 370/335 |
| 2012/0184281 A1* | 7/2012 | Kim | H04W 72/0453 455/450 |

(Continued)

FOREIGN PATENT DOCUMENTS

| CN | 103888261 A | 6/2014 |
| CN | 103986687 A | 8/2014 |

(Continued)

OTHER PUBLICATIONS

3GPP TR 22.885.; "3rd Generation Partnership Project; Technical Specification Group Services and System Aspects; Proximity-Based Services (ProSe); Stage 2 (Release 12)", 3GPP Standard; 3GPP TS 23.303, 3rd Generation Partnership Project (3GPP), Mobile Competence Centre; 650, Route Des Lucioles, F-06921 Sophia-Antipolis Cedex; France; vol. WG2, No. V12.2.0; Sep. 17, 2014; 61 Pages.

(Continued)

*Primary Examiner* — Kan Yuen
(74) *Attorney, Agent, or Firm* — Alliance IP, LLC

(57) ABSTRACT

Technology for a vehicle-to-anything (V2X) a user equipment (UE) to perform V2X communication within a wireless communication network is disclosed. The V2X UE can (Continued)

process, by the V2X UE, for transmission to a V2X function a V2X service registration request having one or more parameters to confirm and authorize the V2X service registration request. The V2X UE can process a V2X service registration authorization response and V2X operation parameters, received by from the V2X function, for permitting the V2X UE to operate in one of a plurality of V2X operation modes. The V2X UE can operate in the one of the plurality of V2X operation modes using the V2X operation parameters.

17 Claims, 14 Drawing Sheets

(51) Int. Cl.
| | | |
|---|---|---|
| *H04W 4/80* | (2018.01) | |
| *H04W 4/44* | (2018.01) | |
| *H04W 60/04* | (2009.01) | |
| H04W 8/00 | (2009.01) | |
| H04W 76/14 | (2018.01) | |
| H04W 4/70 | (2018.01) | |
| H04W 4/46 | (2018.01) | |
| H04W 28/02 | (2009.01) | |

(52) U.S. Cl.
CPC .............. *H04W 60/04* (2013.01); *H04L 67/16* (2013.01); *H04W 4/46* (2018.02); *H04W 4/70* (2018.02); *H04W 8/005* (2013.01); *H04W 28/0268* (2013.01); *H04W 76/14* (2018.02)

(58) Field of Classification Search
CPC ........... H04W 4/48; H04W 4/70; H04W 4/80; H04W 60/04; H04W 76/14; H04W 8/005; G08G 1/00
See application file for complete search history.

(56) References Cited

U.S. PATENT DOCUMENTS

| | | | |
|---|---|---|---|
| 2013/0099941 A1 | 4/2013 | Jana et al. | |
| 2013/0288668 A1 | 10/2013 | Pragada et al. | |
| 2014/0195102 A1 | 7/2014 | Nathanson | |
| 2015/0103763 A1* | 4/2015 | Jung | H04W 28/24 |
| | | | 370/329 |
| 2016/0081123 A1* | 3/2016 | Morita | H04W 92/18 |
| | | | 455/404.1 |
| 2016/0087804 A1* | 3/2016 | Park | H04L 67/12 |
| | | | 713/156 |
| 2018/0049104 A1* | 2/2018 | Van Phan | H04W 76/14 |
| 2018/0192268 A1* | 7/2018 | Xu | G08G 1/00 |

FOREIGN PATENT DOCUMENTS

| | | |
|---|---|---|
| CN | 103999429 A | 8/2014 |
| CN | 104053149 A | 9/2014 |

OTHER PUBLICATIONS

3GPP TS 23.303; "3GPP TR 22.885 Study on LTE Support for V2X Services." Retrieved from http://www.slideshare.net/vihsuchtsai/3gpp-tr-22885-study-on-lte-support-for-v2x-services?fromaction=save; Retrieved From Internet on Apr. 8, 2015; 23 Pages.

Araniti et al.; "LTE for Vehicular Networking: A Survey." Topics in Automotive Networking and Applications; IEEE Communications Magazine; IEEE: May 13, 2013; vol. 51, Issue 5; pp. 148-157.

FCC.; "Amendment of the Commission's Rules Regarding Dedicated Short-Range Communication Services in the 5.850-5.925 GHz Band (5.9 GHz Band), Amendment of Part 2 and 90 of the Commission's Rules to Allocate the 5.850-5.925 GHz Band to the Mobile Service." Jul. 26, 2006; 28 Pages.

IEEE.; "IEEE Guide for Wireless Access in Vehicular Environments (WAVE) Architecture." 1609.0-2013; IEEE Vehicular Technology Society; IEEE; Sponsored by the Intelligent Transportation Systems Committee; Mar. 5, 2014; 78 Pages.

IEEE; "IEEE Standard for Information Technology—Telecommunications and Information Exchange Between Systems—Local and Metropolitan Area Networks—Specific Requirements. Part 11: Wireless LAN Medium Access Control (MAC) and Physical Layer (PHY) Specifications. Amendment 6: Wireless Access in Vehicular Environments." https://www.ietf.org/mail-archive/web/its/current/pdfqf992dHy9x.pdf ; IEEE Computer Society; Jul. 15, 2010, 51 Pages.

PCT Application No. PCT/US2015/000360; Filing Date Dec. 24, 2015, Dave Cavalcanti, International Search Report, dated Jun. 4, 2016, 16 Pages.

SAE International.; "Dedicated Short Range Communications (DSRC) Message Set Dictionary J2735_200612." Surface Vehicle Standard.; Mar. 2016; 267 Pages.

SIPO; First Office Action issued in Chinese Patent Application No. CN 201580080383.0, dated Mar. 24, 2020; 25 pages with English translation.

* cited by examiner

ENHANCED PROXIMITY SERVICES (PROSE) PROTOCOLS FOR VEHICLE-TO-ANYTHING (V2X) COMMUNICATION

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi. In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In addition, devices, including those within one or more vehicles, employing wireless communication systems and methods (e.g., cellular telephones, mobile computers and other mobile devices) are increasingly prevalent. The increase in number of mobile devices has increased the capacity demand and load on cellular networks. Typical cellular networks include stationary cellular antennas (e.g., a cellular tower, such as an eNB, including multiple cellular antennas), which may broadcast to and receive signals from mobile devices to facilitate communication between mobile devices. Also, vehicle-to-anything (V2I), Vehicle-to-vehicle (V2V), and/or Vehicle-to-pedestrian (V2P) communication (subsumed as vehicle-to-X or simply "V2X communication") is the enabling technology for intelligent transport systems (ITS). ITS systems are configured to automate interactions between vehicles in order to achieve, for example, greater levels of communication, safety, security and efficiency.

While the telecommunication anything is to some extent already capable of fulfilling the constraints of certain uses cases (e.g. for some Internet applications), other use cases, particularly in V2X communications, are more demanding and necessitate additional enhancements of the current communication anything. Moreover, current scalability, deployment, functionality, and protocols for V2X communication are inefficient to meet the current demands. Also, cellular systems lack the capability to enable direct communication between V2X devices within a relatively short range (e.g., between 50 to 350 meters (m)) with low latency. Thus, a desire exits for a solution to enable direct discovery and communications between V2X devices while providing functionality and protocols scalable and efficient to meet the constraints of V2X communications in terms of latency and number of V2X devices supported.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
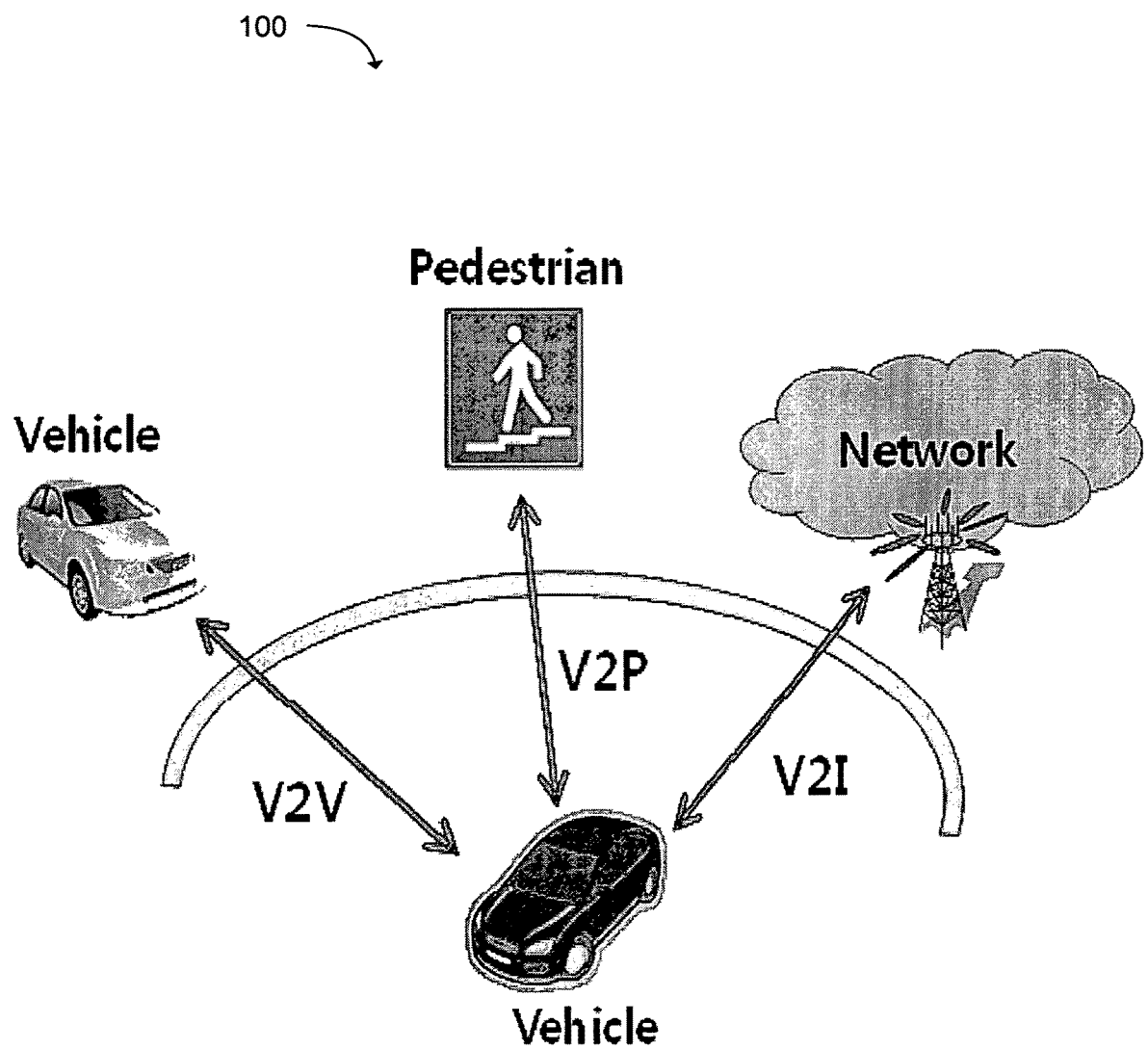
FIG. 1 depicts a V2X communication for vehicle-to-network (V2I), Vehicle-to-vehicle (V2V), and Vehicle-to-person (V2P) in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Intelligent Transportation Systems (ITS) can be enabled by connected vehicles to improve safety and efficiency in roadways. In order to provide wireless access in vehicular environments, a wireless Access Vehicular Environment (WAVE) system architecture is provided. A WAVE system can consist of roadside units (RSUs). The RSUs and mobile terminals may form WAVE basic service sets (WBSSs) connected to the Wide Area Network (WAN) via an appropriate portal. Also, the Wireless Access in Vehicular Environments (WAVE) architecture and standards can support ITS safety and non-safety applications. The WAVE standards can be based on IEEE 802.11p (e.g. Dedicated Short Range Communications "DSRC"), to support Vehicle-to-Anything (V2X) communications, which can include V2X communication for vehicle-to-Anything (V2I), Vehicle-to-vehicle (V2V), and Vehicle-to-person/pedestrian (V2P) communications.

The DSRC/802.11p can support short-range and low power communication in the 5.9 GHz spectrum, which has been dedicated for ITS. However, some ITS applications can use the deployment of DSRC/802.11p-based Road Side Units (RSU), which can impose scalability and deployment cost challenges. Despite of the standards and dedicated spectrum, DSRC/802.11p based ITS applications have not been widely deployed.

Existing cellular systems, such as third generation partnership project (3GPP) long term evolution (LTE), can be used as an alternative to DSRC/802.11p given its large scale coverage and efficient spectrum utilization. However, one of the issues in 3GPP LTE is that the system was mostly developed for IP communication over the Internet. Also, cellular systems lack the capability to enable direct communication between devices V2X devices within a relatively short range, such as, for example, between 50 to 350 meters (m) with low latency. Proximity-based Service (ProSe) can be utilized in a user equipment (UE), an evolved Node B (eNB) and a mobility management entity (MME) in wireless communications systems. That is, ProSe can be utilized for UE to UE (or D2D) communication. Although some functionality may be provided in the eNB and Core network to authorize and configure the D2D communication, there is no ProSe in the MME. The eNB may include a ProSe to communicate with the UEs as well, but it is not a necessity. However, existing ProSe architecture and protocols have been mainly limited to public safety (e.g., voice communication between emergency responders) and consumer applications (e.g. advertisement, location information, social networks). Therefore, existing LTE ProSe functionality and protocols are not scalable to efficiently to meet the constraints of V2X communications in terms of latency and number of vehicles supported.

Figure 4:
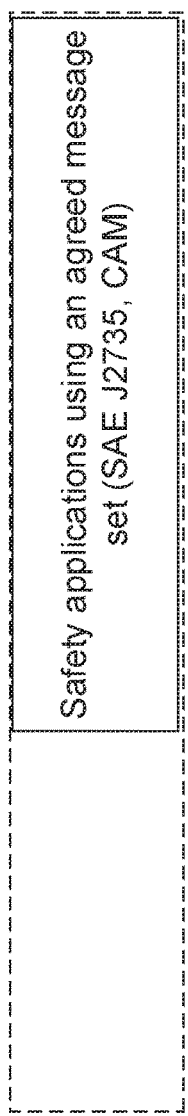
FIG. 4 illustrates intelligent transport systems (ITS) standards stack used in a V2X safety application within a wireless communication network in accordance with an example.
Figure 4:
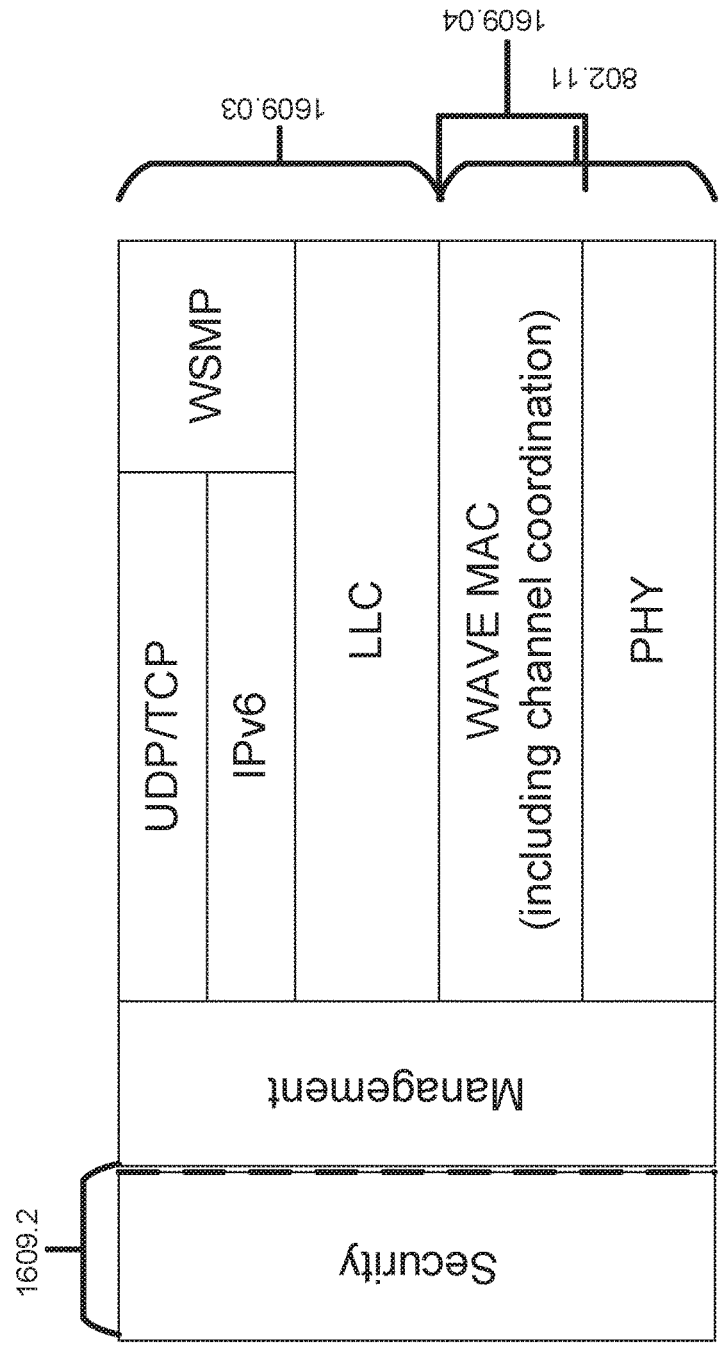

Furthermore, it should be noted that, in one aspect, ITS applications rely on the concept of situation or co-operative awareness, which can be based on periodic and event-driven broadcast of basic safety messages (BSM). The BSM short messages can be useful to identify situations that can benefit from rapid action (e.g. collision warning, emergency stop, pre-crash warning, etc.) within very short intervals (e.g. 20 to 100 milliseconds "msec"). However, minimizing overhead involved transmission and reception of BSMs is a challenge for supporting direct communication for V2X devices over a cellular systems. The BSM can be one of the application layer messages defined by a Dedicated Short Range Communications (DSRC) Message Set Dictionary, such as the standard SAE J2735 DSRC Message Set Dictionary. The SAE J2735 standard defines only the message format, but an underlying communication service is desired to support the applications. Alternatively, the BSM message format can be defined in IEEE standard 1609.0.2013, which can provide communication services on top of the IEEE 802.11p MAC and PHY layers, jointly known as the WAVE standards. Although communication services can be performed by the application via IP, the added overhead and latency may not be acceptable for V2X safety applications. This overhead and latency was recognized by the WAVE/DSRC ecosystem, and a WAVE Short Message Protocol (WSMP) was defined for optimized operation for safety application that use BSM messages, as illustrated in FIG. 4. However, WAVE is currently the only communication service available to transmit BSM messages. Thus, in order to enable 3GPP LTE to provide communication service available to transmit BSM messages, the technology provides a new interface and enhanced ProSe direct discovery protocol to support a V2X message exchange. IT should be noted that a V2X safety message can include a cooperative awareness messages (CAM), a Decentralized Environmental Notification Messages (DENM), or a Basic Safety Messages (BSM). The CAM and DENM can be used in European (EU) standards and the BSM in United States (US) standards. The CAM can be periodically broadcast, and the DENM can be triggered by events. The BSM can be both a periodic broadcast and triggered by events.

Also, current ProSe architecture and procedures add excessive communication between UEs and the ProSe Function in a core network (CN) and additional protocol layers (e.g. IP, PLCP) for direct communication between UEs, which are not necessitated for BSMs exchanges in V2X applications. Although the ProSe direct discovery protocol has an "I am here" discovery mode (mode A), the ProSe direct discovery protocol necessitates UEs to send authorization requests to the ProSe Function before every transmission. Also, the intention of the ProSe direct discovery is for UEs to monitor messages from specific sources/applications, and monitoring UEs are configured to report every match back to the ProSe Function. Also, BSMs are open broadcasts that are useful locally by the UE, and reporting back every V2X message to the ProSe Function is a waste of resources.

Thus, the present technology introduces new functionalities and procedures that enable exchange of periodic and event-driven BSMs between UEs using the new interface (e.g., PC5 interface of FIG. 2) while meeting latency and scalability constraints for V2X applications. In one aspect, the present technology provides a solution to enable direct discovery and communications between V2X devices while also providing enhanced 3GPP LTE Proximity Services (ProSe) functionality and protocols scalable and efficient to meet the constraints of V2X communications in terms of latency and number of V2X devices supported.

In one aspect, the present technology provides enhanced proximity services (ProSe) protocols for vehicle-to-anything (V2X) communication for a vehicle-to-anything (V2X) a user equipment (UE) and to perform direct V2X communication within a wireless communication network is disclosed. The V2X UE can process, by the V2X UE, for transmission to a V2X function a V2X service registration request having one or more parameters to confirm and authorize the V2X service registration request. The V2X UE can process a V2X service registration authorization response and V2X operation parameters, received by from the V2X function, for permitting the V2X UE to operate in one of a plurality of V2X operation modes. The V2X UE can operate in the one of the plurality of V2X operation modes using the V2X operation parameters.

In one aspect, a vehicle-to-anything (V2X) function performs vehicle-to-anything (V2X) communication with a V2X user equipment (UE) within a wireless communication network. The V2X function can receive, from the V2X UE, a V2X service registration request having one or more parameters to confirm and authorize the V2X service registration request. The V2X function can forward to the V2X service registration request to one or more additional V2X functions. The V2X function can send, to the V2X UE, a V2X service registration authorization response and V2X operation parameters to allow the V2X UE to operate in one of a plurality of V2X operation modes.

In one aspect, a vehicle-to-anything (V2X) a user equipment (UE) to perform V2X communication within a wireless communication network is disclosed. The V2X UE can send, by the V2X UE, to a V2X function a V2X service registration request having one or more parameters to confirm and authorize the registration request. The V2X UE can process a V2X service registration authorization response and V2X operation parameters, received by from the V2X function, for permitting the V2X UE to operate in one of a plurality of V2X operation modes. The V2X UE can operate in either a V2X cooperative mode or a V2X listen-only mode, wherein the V2X cooperative mode permits the V2X UE and one or more alternative V2X UEs to transmit and receive cooperative awareness messages (BSM), and the V2X listen-only mode permits the V2X UE and one or more alternative V2X UEs to listen to a cooperative awareness messages (BSM).

It should be noted that as used herein, a V2X UE can be a UE that supports ProSe and V2X enabling features, as defined herein. A V2X ProSe Function can be a V2X specific functionality that may be part of the ProSe function or stand alone V2X ProSe Function.

FIG. 1 depicts a V2X communication system 100 for vehicle-to-network (V2I), Vehicle-to-vehicle (V2V), and Vehicle-to-person (V2p). As depicted, the V2X communication system 100 includes vehicle-to-network (V2I), Vehicle-to-vehicle (V2V), and Vehicle-to-person/pedestrian (V2P) each having communication devices that autonomously communicate with one another for providing global positioning and other safety-related information for making their presence heading, proximity, or other positional-related information known to one another. It should be understood that the term pedestrian used herein includes a pedestrian standing, walking, jogging, or a person utilizing a non-automobile form of transportation (e.g., bicycle) that is positioned in the road or in close proximity to the road.

The V2X communication system 100 can include one or more processors and (e.g., a V2X communication device) for controlling the communication with a vehicle, a pedestrian, and/or a network. For example, the V2X communication system 100 can include an on-board computer that may be used to communicate data messages between a vehicle, a pedestrian, and/or a network via a transmitter and receiver, or similar device for receiving and transmitting data messages and files. A dedicated short range communication protocol (DSRC) can be used to provide data transfer between a vehicle, a pedestrian, and/or a network. Moreover, the V2X communication system 100 can include a user equipment (UE), which can be a V2X UE, which can communicate with one or more alternative V2X UEs and/or an eNodeB to provide messages, data transfer and communication between vehicles, a pedestrian, and/or a network. The network may be a cell having one or more V2X UEs and one or more eNodeBs. That is, a "cell" can refer to a particular geographic coverage area of an eNodeB and/or an eNodeB subsystem serving the coverage area.

Figure 2:
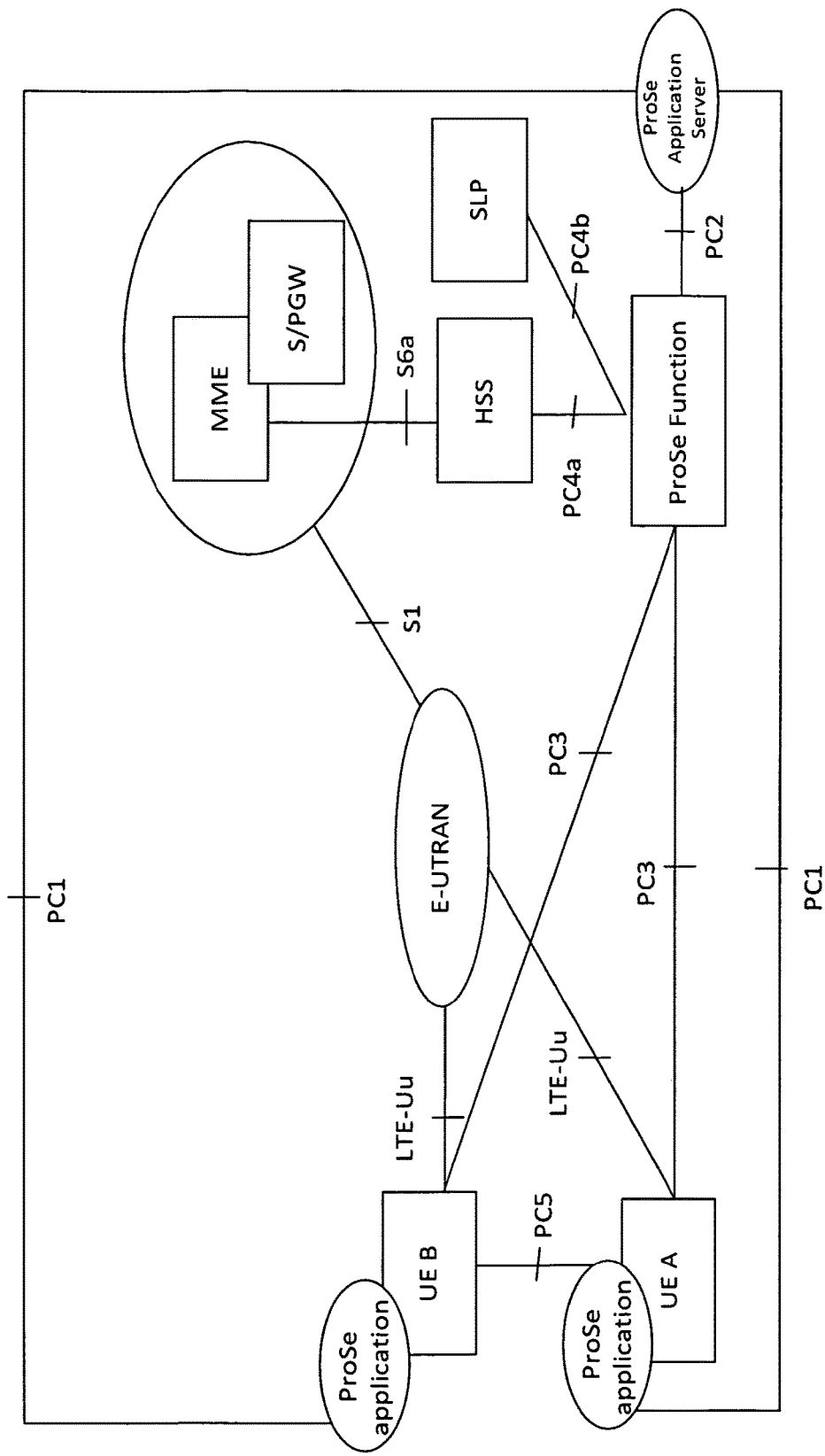
FIG. 2 illustrates a proximity services (ProSe) architecture and interfaces in accordance with an example.

FIG. 2 illustrates a public land mobile network (PLMN) architecture. FIG. 2 depicts a Proximity-based Service (ProSe) communication system 200 developed as a technology which allows V2X UEs to directly communicate with each other in close proximity without transmitting/receiving data and/or control signals to the other via an eNB, which means a local or direct path can be used between the UEs. That is, FIG. 2 depicts a ProSe application, user equipment (UE) A, UE B, a mobility management unit (MME), an evolved universal terrestrial radio access network (E-UTRAN), a ProSe function, a subscriber servicer (HSS), a Location Platform (SLP), a ProSe application server, and serving gateway (SGW) and/or a packet data network (PDN) gateway (PGW) (e.g., S/P-GW), and one or more communication interfaces, such as, for example, LTE-Uu, S1, S6a, PC4a, PC4b, PC1, PC2, and PC3.

The ProSe function can be a logical function that can be used for network related actions configured for ProSe. The ProSe function can play different roles for each of the features of ProSe. PC1 can be a reference point between the ProSe application in the UE and in the ProSe Application Server. PC1 can be used to define application level signalling constraints. PC2 can be reference point between the ProSe Application Server and the ProSe Function. PC2 can be used to define the interaction between ProSe Application Server and ProSe functionality provided by the 3GPP EPS via ProSe Function (e.g. name translation) for an evolved packet core (EPC)-level ProSe discovery. PC3 can be a reference point between the UE and the ProSe Function. PC3 can rely on an EPC user plane for transport (i.e. an "over internet protocol (IP)" reference point). It is used to authorize ProSe Direct Discovery and EPC-level ProSe Discovery requests, and perform allocation of ProSe Application Codes corresponding to ProSe Application Identities used for ProSe Direct Discovery. PC3 can be used to define the authorization policy per PLMN for ProSe Direct Discovery (for Public Safety and non-Public Safety) and communication (for Public Safety only) between UE and ProSe Function. PC4a can be reference point between the HSS and ProSe Function. PC4a can be used to provide subscription information in order to authorize access for ProSe Direct Discovery and ProSe Direct Communication on a per PLMN basis. PC4a can also be used by the ProSe Function (i.e. EPC-level ProSe Discovery Function) for retrieval of EPC-level ProSe Discovery related subscriber data.

PC4b can be a reference point between a secure user plane location (SUPL) Location Platform (SLP) and the ProSe Function. PC4b can be used by the ProSe Function (i.e. EPC-level ProSe Discovery Function) (in the role of LCS client to query the SLP). PC5 can be a reference point between ProSe-enabled UEs used for control and user plane for ProSe Direct Discovery, ProSe Direct Communication and ProSe UE-to-Network Relay.

In addition to the relevant functions defined in 3GPP TS 23.401 for S6a, ProSe S6a can be used to download ProSe related subscription information to mobility management unit (MME) during evolved universal terrestrial radio access network (E-UTRAN) attach procedure or to inform the MME subscription information in the HSS has changed. In addition to the relevant functions defined in 3GPP TS 23.401 for S1-MME, ProSe S1-MME can be also used to provide an indication to eNB that the UE is authorized to use ProSe Direct Discovery.

Figure 3:
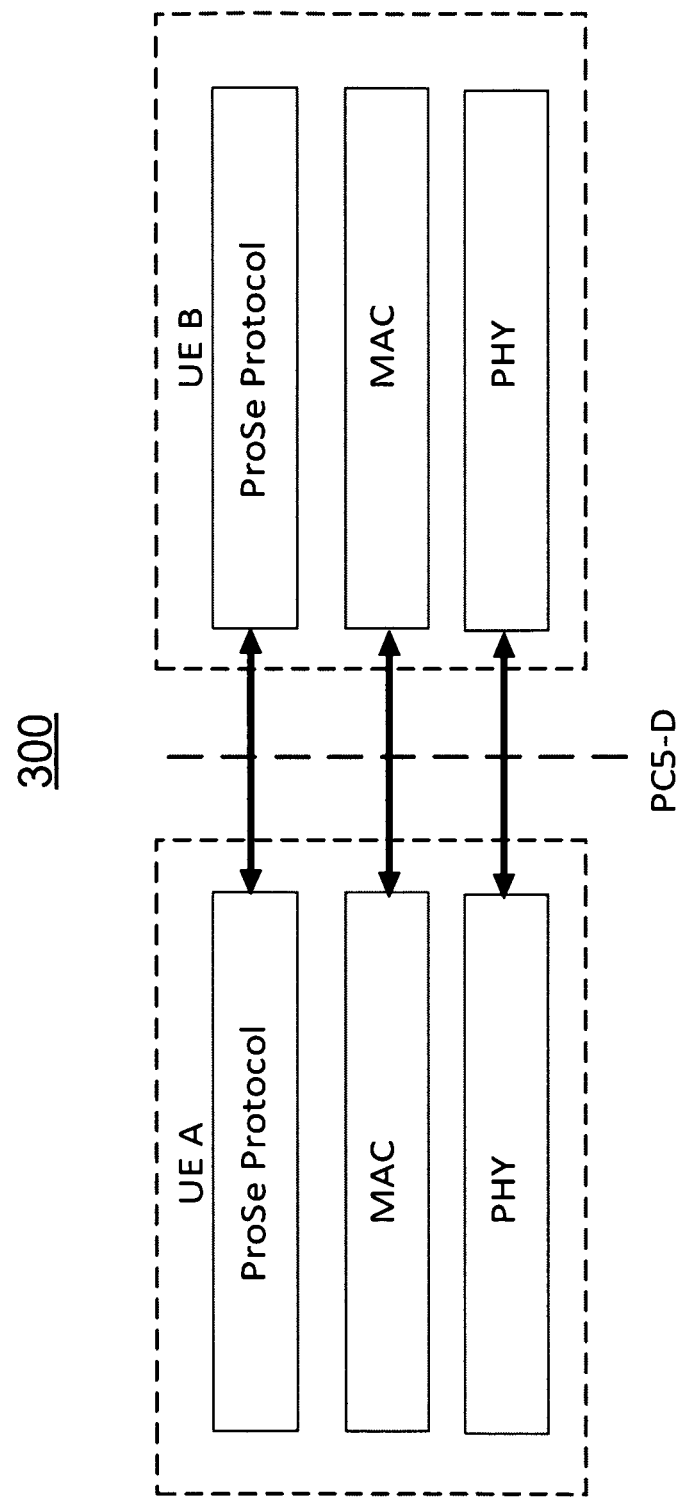
FIG. 3 illustrates a proximity services (ProSe) protocol for direct discovery communication over media access control (MAC) and physical (PHY) layers in accordance in accordance with an example.

In one aspect, PC5 can be a new communication interface (PC5) that enables direct discovery, control signaling and data communication between one or more UE's, such as UE A and UE B, both of which may be V2X UE devices. Direct discovery can be based on short messages exchanges between UEs, such as UE A and UE B, that can be defined by a ProSe Protocol, and carried directly over a media access control (MAC) layer and a physical (PHY) layers, as illustrated in FIG. 3, which illustrates a proximity services (ProSe) architecture and interfaces for enhanced proximity services (ProSe) protocols for vehicle-to-anything (V2X) communication for a vehicle-to-anything (V2X) a user equipment (UE) and to perform direct V2X communication within a wireless communication network.

In one aspect, the PC5 interface provides direct data communication between UEs, such as UE A and UE B, is carried over a user-plane stack, which includes an internet protocol (IP), a packet data convergence protocol (PDCP), a radio resource control (RRC), the MAC layer, and the PHY layer. A new ProSe Function is provided in a Core Network (CN) to control and configure how UEs use the new PC5 interface. A ProSe application on the UE communicates with the ProSe Function over the PC3 reference point, which relies on EPC user plane for transport (i.e. an "over IP" reference point). In one aspect, the 3GPP LTE ProSe architecture ensures the UEs communication over the PC5 is always under control of the network through the ProSe Function.

Thus, the present technology provides one or more procedures and message flows defined between the UEs and the ProSe Function to enable Direct Discovery and Communication Services over PC5. In one aspect, the present technology provides a new V2X ProSe Protocol over the PC3 interface and V2X Operation procedures to enable exchange of messages (e.g. BSMs) between V2X UEs over the PC5 interface. The PC5 V2X ProSe protocol carries ITS traffic (e.g. BSM) directly on top of the MAC and PHY in order to minimize overhead and latency. The same ideas disclosed here also apply in case the ITS traffic is sent using IP transport protocol. The present technology provides new V2X operation modes to support a co-operative awareness concept and eliminate unnecessary control signaling between UEs and the ProSe function over the CN. In one aspect, cooperative-awareness can refer to the process of vehicles exchanging messages between each other to obtain more information about the vehicles surroundings and detect safety events that may necessitate a certain action. These messages may include CAN, DENM and BSM messages. Furthermore, new V2X service authorization information can be introduced to a main ProSe authorization procedure with minimal overhead to enable configuration of V2X operation modes. That is, a new V2X authorization procedure is provide herein and included as part of the procedure to obtain authorization for ProSe services.

In one aspect, the present technology request and receives V2X Service Authorization in a cellular system. In one aspect, V2X operation parameters can be identified, configured, and controlled in V2X devices. A V2X communication protocol can be provided for V2X application messages over the ProSe PC5 interface.

V2X Service Registration

Figure 5:
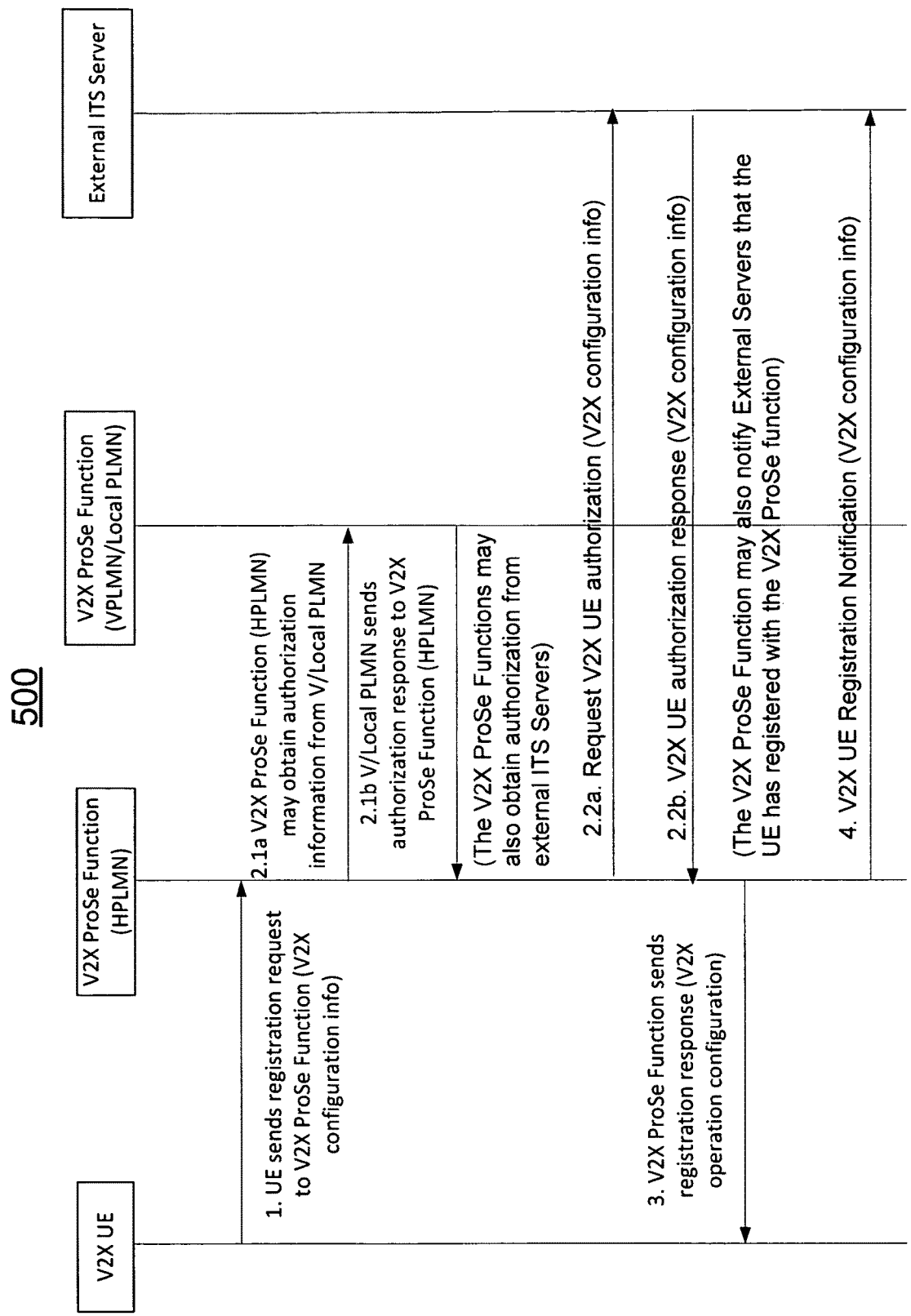
FIG. 5 illustrates a V2X service registration operation within a wireless communication network in accordance with an example.

Turning now to FIG. 5, a V2X service registration operation within a wireless communication network is provided. In one aspect, a V2X UE can be pre-configured by a home public land mobile network (HPLMN) with information to identify and authorize the V2X UE to start a V2X operation. The V2X UEs communicate with the V2X ProSe Function over the PC3 interface as shown FIG. 1. The V2X UE requests authorization from the V2X ProSe Function to use V2X services. In one aspect, the information included in the V2X registration request can be described in Table 1. It should be noted that one or more fields of the Information in V2X Service Registration Request are optional.

TABLE 1

Example of Information in a V2X Service Registration Request

| Field | Size Example (bits) | Description |
|---|---|---|
| PSID | 8 to 32 | The PSID (Provider Service Identifier) identifies an application service that uses the V2X communication. For instance, the PSID value 0x20 can be allocated to ITS applications that use BSMs defined in SAE J2735. Other PSID values can be defined in IEEE 1609.12. The PSID value can be used by the V2X ProSe function to determine the type of communication services the V2X UE is authorized to use. |
| V2XMode | 1 | Two V2X operation modes the V2X is authorized to operate in can be defined as 1) Cooperative mode or 2) Listening-only mode |
| V2XCoopTxRate | 8 | Defines a rate at which the V2X UE is configured to transmit messages (BSM) in the cooperative mode. The default rate can be 10 Hz. V2XCoopTxRate can be used to enable rate adaptation, which may be done based on application layer context information and/or network capacity. |
| Certificate Request | TBD | If authentication is based on public or private keys and certificates are supported, the V2X UE can include a certification request in the V2X service registration request. The certificate request can include V2X specific security credentials and one or more PSIDs (Provider Service Identifier). The PSID can identify an application service that uses the V2X communication. For instance, the PSID value 0x20 has been allocated to ITS applications that use BSMs defined in SAE J2735. Other PSID values can be defined in IEEE 1609.12. The certificate can be used to sign messages associated to multiple PSID supported by the UE. |

In one aspect, the V2X ProSe Function can use the information of the V2X registration request to authorize and confirm the registration of the V2X UE. As part of the V2X registration request, the V2X ProSe Function can communicate with the HSS and/or other V2X ProSe Functions, depending on the PLMN attached to the V2X UE, as illustrated in FIG. 5.

As depicted in FIG. 5, the V2X registration request can include the follow. In action 1), the UE can send the V2X registration request having V2X configuration information to the ProSe function (e.g., HPLMN). In action 2.1a) the V2X ProSe Function can obtain authorization information from a local V2X ProSe Function (e.g., a local PLMN). In action 2.1b), the local V2X ProSe Function can send an authorization request to the V2X Prose Function (HPLMN). The V2X ProSe Functions can obtain authorization from an external ITS server. In action 2.2a), the V2X Prose Function (HPLMN) can request (from an External ITS sever) a V2X UE authorization and V2X configuration information. In action 2.2.b) the V2X Prose Function (HPLMN) can receive a V2X UE authorization response and V2X configuration information. In action 3) the V2X Prose Function (HPLMN) sends to the V2X UE a V2X registration response and V2X operation configuration information. In action 4), the V2X Prose Function can also notify the external ITS server that the V2X UE has registered with the V2X Prose Function (HPLMN).

In one aspect, if the V2X UE is successfully authorized, the V2X ProSe Function can confirm the registration and send V2X configuration information to the V2X UE. In one aspect, the configuration information can include the information in the fields described Table 2. Some of the information in the fields can be optional.

TABLE 2

V2X Service registration response.

| Field | Size Example (bits) | Description |
|---|---|---|
| UETempID | 32 | A UETempID can be an identifier assigned by the V2X ProSe Function to be used in V2X messages sent over the PC3 and PC5 interface. The UETempID can provide anonymity to the UEs, therefore the UETempID is be different from other IDs and can be used to identify the UE and its owner. The UETempID can be be periodically updated in order to prevent tracking of the UE. |
| V2XMode | 1 | Two V2X operation modes the V2X is authorized to operate in can be defined as 1) Cooperative mode or 2) Listening-only mode |
| V2XCoopTxRate | 8 | Defines the rate at which the V2X UE is configured to transmit messages (BSM) in the cooperative mode. The V2X ProSe function can use this field to enable rate adaptation, which can be done based on application layer context information and/or network capacity. |
| Validity Time | ? | Defines the time interval during which the registration and configuration parameters are valid. |
| Certificate Response | TBD | If the V2X UE has requested a Certificate, the V2X ProSe Function can use a certificate response to provide the certificate(s) to be used by the UE. |

V2X Operation Modes

In one aspect, at least two V2X operation modes can be provided; 1) V2X Co-operative mode, and 2) V2X Listening-only mode. In one aspect, the V2X UEs can only operate in one of the two modes at any given time. Both the V2X ProSe Function and the V2X UEs can trigger a V2X operation mode switch procedure.

V2X Co-Operative Mode: "Co-Operative Awareness"

In a V2X Co-operative mode, V2X UEs can transmit and receive cooperative awareness messages (BSM). The co-operative awareness mode can enable the co-operative awareness concept. In one aspect, the co-operative awareness mode can be a default operation mode when the V2X UEs are initially authorized by the V2X ProSe Function. In one aspect, the co-operative awareness mode can enable V2X UEs with different functionalities (e.g. a UE operating as RSU or pedestrian) to discover each other. The V2X ProSe Function can also configure the BSM transmission rate for UEs in the co-operative awareness mode as described Table 2.

V2X Listening-Only Mode: "Passive Discovery"

In the Listening-only mode, V2X UEs can only listen to BSM messages from other UEs. The V2X Listening-only mode can be used to optimize radio resources by controlling V2X UEs that are actively transmitting BSMs (e.g. in a traffic jam, where safety risk is small, and the UEs can be transferred to the V2X Listening-only mode by the V2X ProSe function to avoid unnecessary network overload). For example, if a V2X UE is operating as a RSU in an intersection and the V2X UE has a primary role to gather information from the environment (e.g. vehicles, sensors, cameras, etc.) in order to detect relevant events that necessitate action, the RSU does not have to continuously transmit BSMs, but only in case an emergency situation arises. The V2X Listening-only mode can also be used to eliminate redundant announcements from vehicles traveling in a group (e.g. platoon), as the ProSe Function can select certain vehicles to transmit BSMs, while switching others to listening-only discovery.

V2X Operation Mode—Switch Procedure

Figure 6:
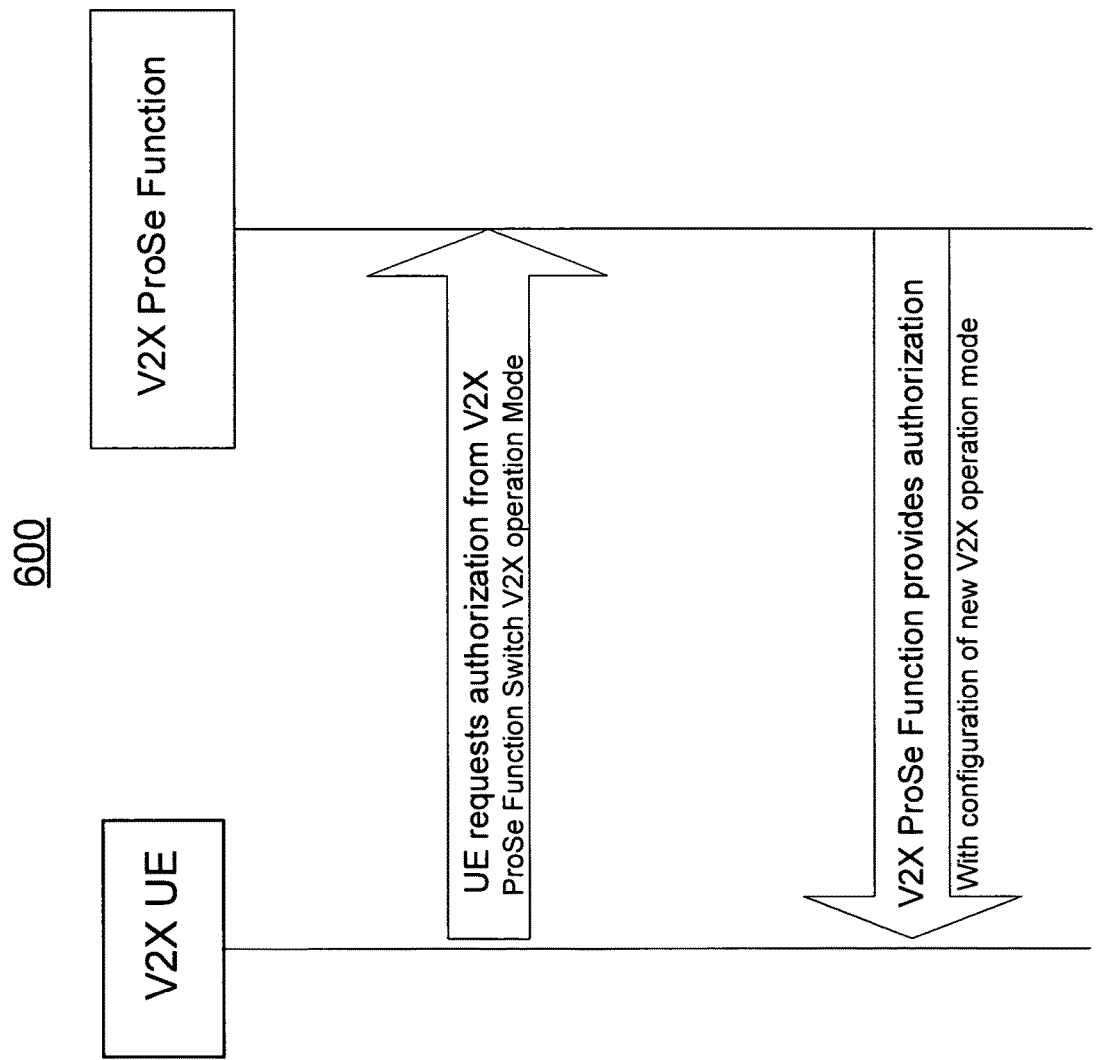
FIG. 6 illustrates triggering a V2X operation mode switch procedure for a V2X user equipment (UE) within a wireless communication network in accordance with an example.

In one aspect, the V2X operation mode of the V2X UE can be updated and/or switched by the ProSe Function at any time by sending a V2X registration response with updated V2X mode information to the UE. The V2X UE can trigger a V2X operation mode switch. In one aspect, to switch the V2X operation mode, authorization can first be obtained from the V2X ProSe Function by sending a V2X registration request with a target operation mode information. If authorized, the V2X UE can start operating in the new V2X operation mode using the configuration parameters received from the V2X ProSe Function. The message flow can be illustrated in FIG. 6. FIG. 6 illustrates triggering a V2X operation mode switch procedure for a V2X user equipment (UE) within a wireless communication network. In one aspect, in action 1) the V2X UE can request authorization from the V2X ProSe function for permission to switch and/or update the V2X operation mode. In action 2) the V2X Function sends the V2X UE authorization with configuration information for operating in a new and/or updated V2X operation mode.

Co-Operative Message Rate Adaptation

In one aspect, one of the configurable parameters provided by the V2X ProSe Function can be a rate at which V2X UEs can be configured to transmit cooperative messages (see V2XCoopTxRate defined in Table). The V2X ProSe Function can configure a message transmission rate based on the service provided and quality of services (QoS)/priorities associated with the UEs. For example, V2X UEs supporting an emergency vehicle warning application can be allowed to transmit announcements more frequently as compared to a V2X UE operating as a RSU that is providing only traffic information services (non-safety) to other UEs.

In one aspect, V2X UEs can also request the V2X ProSe Function to update the message transmission rate of the V2X UE. For example, during a normal operation, a V2X UE can operate with a longer interval between transmissions, such as, for example, 100 msec. However, if an internal engine problem is detected that may impact the behavior of the vehicle, the V2X UE can request the V2X ProSe Function to increase a transmission rate of the V2X UE so the V2X UE can react faster in case an emergency situation is detected (e.g. vehicle stops in a highways) and the BSMs desires to reach other vehicles in shorter period of time (e.g. 20 msec).

Figure 7:
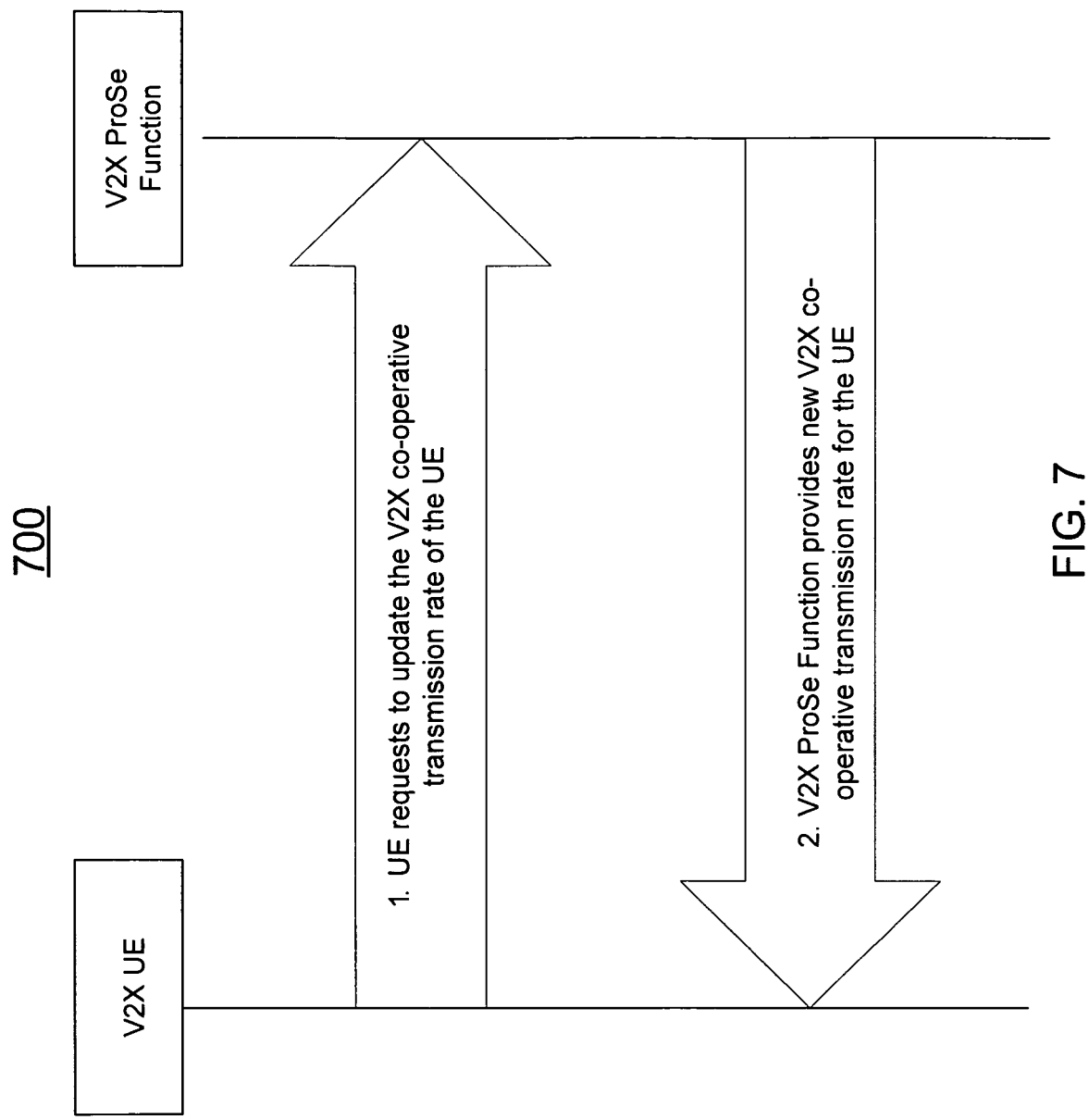
FIG. 7 illustrates a V2X co-operative transmission rate update operation within a wireless communication network in accordance with an example.

FIG. 7 illustrates a V2X co-operative transmission rate update operation within a wireless communication network. In one aspect, in action 1) the V2X UE can request authorization from the V2X ProSe function for permission to switch and/or update the V2X co-operative transmission rate. In action 2) the V2X Function sends the V2X UE authorization with a new and/or updated V2X co-operative transmission rate.

V2X ProSe Protocol and V2X Application Message Encapsulation

Figure 8:
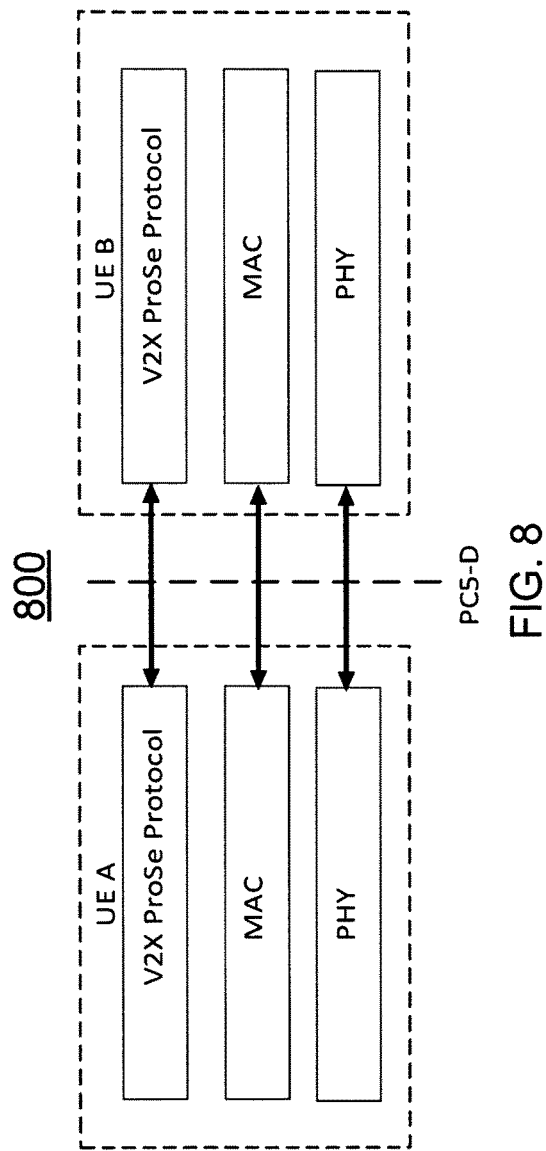
FIG. 8 illustrates a V2X proximity services (ProSe) protocol for direct discovery communication over media access control (MAC) and physical (PHY) layers in accordance with an example.
Figure 9:
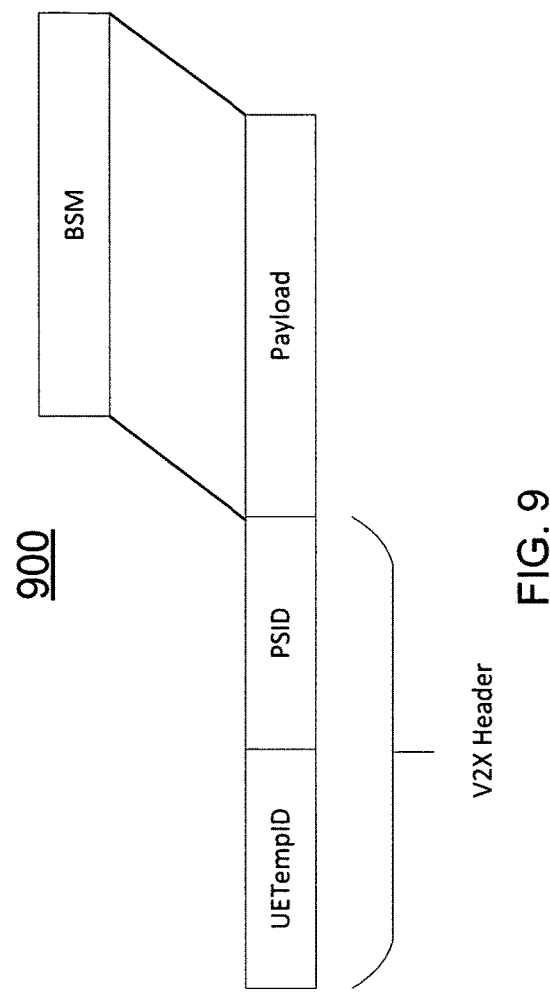
FIG. 9 illustrates a V2X ProSe cooperative message format in accordance with an example.

In one aspect, a V2X ProSe protocol can define V2X message exchanges between V2X UEs (e.g., UE A and UE B of FIG. 8) over the PC5 interface. V2X ProSe messages can be carried directly over the MAC and PHY, as defined in FIG. 8. The proposed V2X ProSe Protocol message format can be defined in FIG. 9. That is, FIG. 8 illustrates a proximity services (ProSe) protocol for direct discovery communication over media access control (MAC) and physical (PHY) layers and FIG. 9 illustrates a V2X ProSe cooperative message format. FIG. 9 defines a V2X header as containing a V2X UE temporary identification (V2X UETempID or "UETempID) and a provider service identifier (PSID). That is, the V2X header can consist of a V2X Layer identifier of the transmitting V2X UE (UETempID) and the PSID. The PSID (Provider Service Identifier) can identify an application service that uses the V2X communication.

In one aspect, the PSID value can be 1 to 8 bytes and the PSID value can be used by a receiving V2X UE to deliver a V2X messages to the appropriate higher layer entity. For example, the PSID value 0x20 can be allocated to ITS applications that use BSMs defined in SAE J2735 and/or other PSID values can be defined in IEEE 1609.12

In an alternative aspect, a V2X header can be part of the MAC header. V2X UEs operating in cooperative mode can be allowed to transmit V2X BSM messages according to the V2XCoopTxRate configuration. The V2X messages can be transmitted as broadcasts, and any listening V2X UE can receive and decode the message at the V2X ProSe Application. The authorization to transmit V2X cooperative BSMs can be provided by the V2X ProSe Function during an initial authorization procedure. Thus, any prerequisite for the V2X UE to send a discovery request to the ProSe Function before transmitting BSMs, as in current LTE ProSe solutions, can be eliminated.

V2X UEs that receive V2X cooperative messages for other UEs do not have to send a report back to the V2X ProSe Function, which greatly reduces the overhead create by sending match reports to the ProSe Function over the CN as in the current LTE ProSe specification. However, the UEs may decide to send/forward information back to the V2X ProSe Function based on the content of the BSM messages received.

Figure 10:
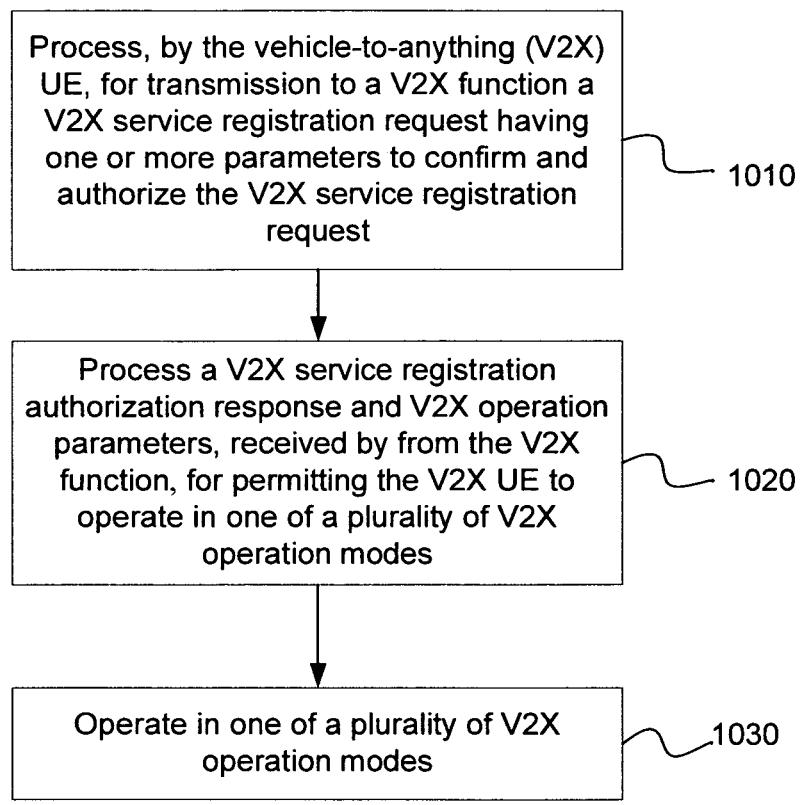
FIG. 10 depicts functionality of a V2X user equipment (UE) for enhanced proximity services (ProSe) protocols for vehicle-to-anything (V2X) communication within a wireless communication network in accordance with an example.

Another example provides functionality 1000 of an V2X user equipment (UE) operable to perform enhanced proximity services (ProSe) protocols for vehicle-to-anything (V2X) communication, as shown in the flow chart in FIG. 10. The functionality can be implemented as a method or the functionality can be executed as instructions on a machine, where the instructions are included one or more computer readable mediums or one or more non-transitory machine readable storage mediums. The V2X UE can comprise one or more processors and memory configured to: process, by the vehicle-to-anything (V2X) UE, for transmission to a V2X function a V2X service registration request having one or more parameters to confirm and authorize the V2X service registration request, as in block 1010. The V2X UE can comprise one or more processors and memory configured to: process a V2X service registration authorization response and V2X operation parameters, received by from the V2X function, for permitting the V2X UE to operate in one of a plurality of V2X operation modes, as in block 1020. The V2X UE can comprise one or more processors and memory configured to: operate in the one of the plurality of V2X operation modes using the V2X operation parameters, as in block 1030. That is, the one or more processors and memory can be configured to operate in either a V2X cooperative mode or a V2X listen-only mode, wherein the V2X cooperative mode permits the V2X UE and one or more alternative V2X UEs to transmit and receive cooperative awareness messages (BSM), wherein the V2X listen-only mode permits the V2X UE and one or more alternative V2X UEs to listen to a cooperative awareness messages (BSM)

Figure 11:
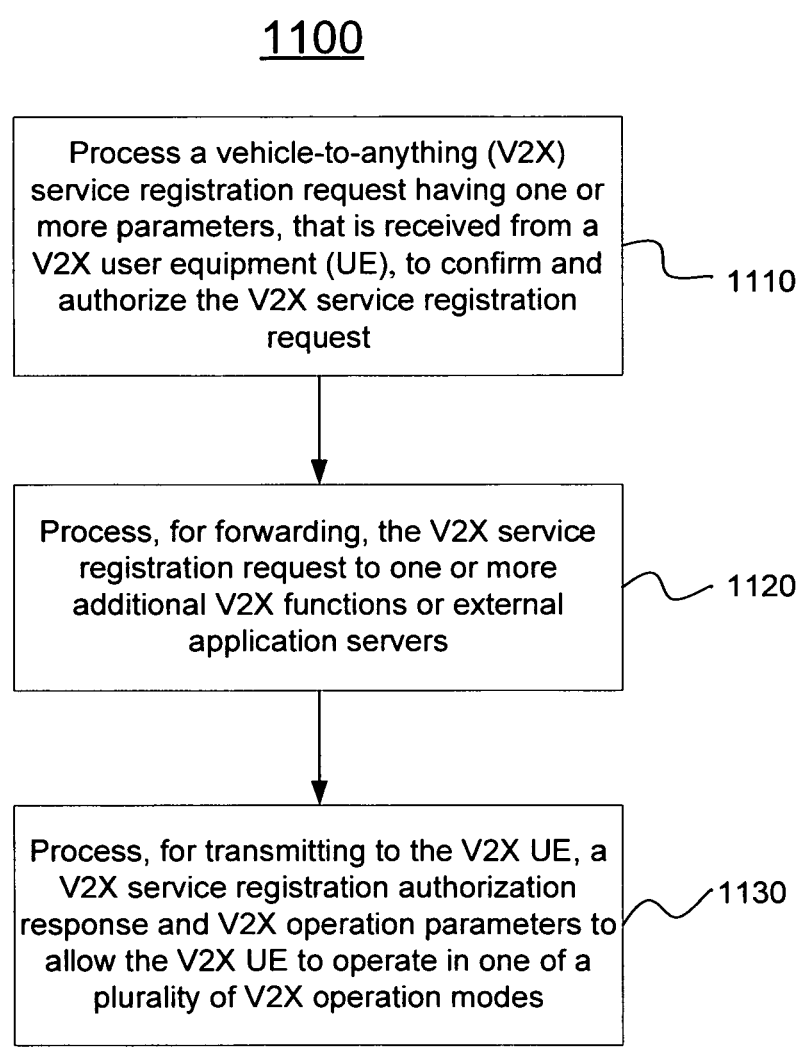
FIG. 11 depicts functionality of a V2X function operable to perform enhanced proximity services (ProSe) protocols for vehicle-to-anything (V2X) within a wireless communication network in accordance with an example.

Another example provides functionality 1100 of V2X function operable to perform enhanced proximity services (ProSe) protocols for vehicle-to-anything (V2X) communication within a wireless communication network, as shown in the flow chart in FIG. 11. The functionality can be implemented as a method or the functionality can be executed as instructions on a machine, where the instructions are included one or more computer readable mediums or one or more non-transitory machine readable storage mediums. The V2X function can comprise one or more processors and memory configured to: process a vehicle-to-anything (V2X) service registration request having one or more parameters, which is received from a V2X user equipment (UE), to confirm and authorize the V2X service registration request, as in block 1110. The V2X function can comprise one or more processors and memory configured to: process, for forwarding, the V2X service registration request to one or more additional V2X functions or external application servers, as in block 1120. The V2X function can comprise one or more processors and memory configured to: process, for transmitting to the V2X UE, a V2X service registration authorization response and V2X operation parameters to allow the V2X UE to operate in one of a plurality of V2X operation modes, as in block 1130.

Figure 12:
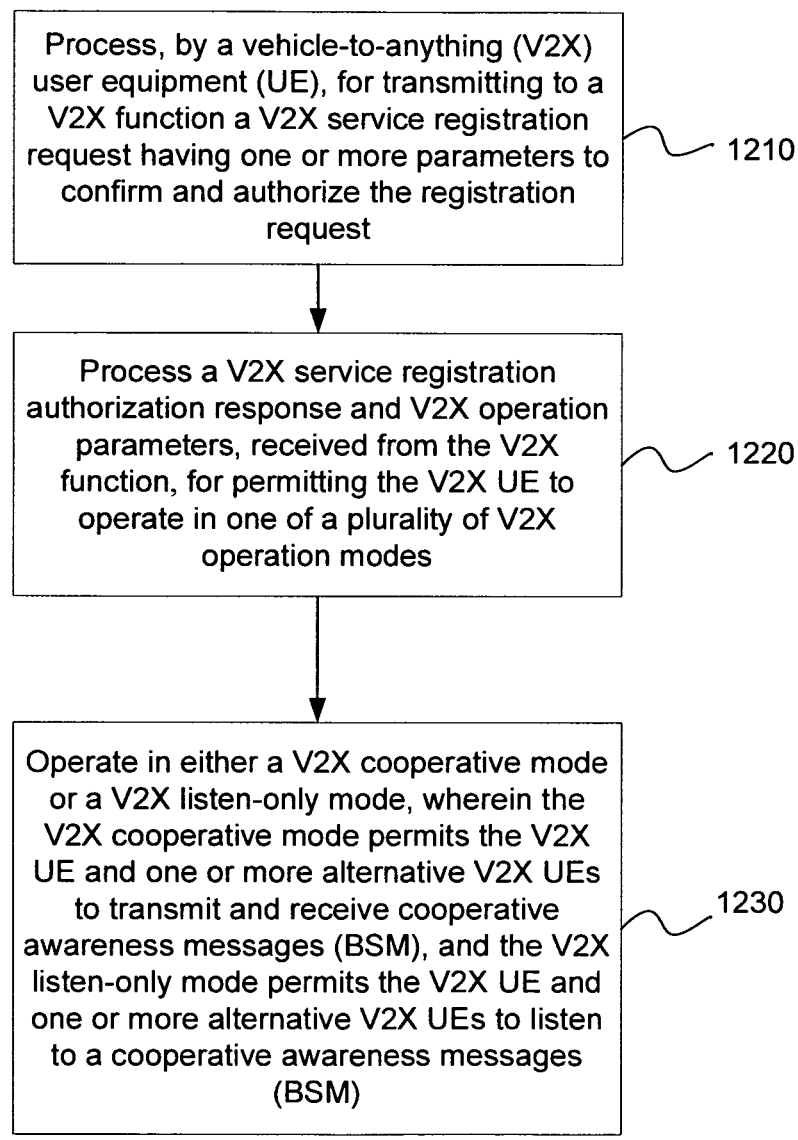
FIG. 12 depicts functionality of a V2X user equipment (UE) for enhanced proximity services (ProSe) protocols for vehicle-to-anything (V2X) communication within a wireless communication network in accordance with an example.

Another example provides functionality 1200 of an V2X user equipment (UE) operable to perform enhanced proximity services (ProSe) protocols for vehicle-to-anything (V2X) communication, as shown in the flow chart in FIG. 12. The functionality can be implemented as a method or the functionality can be executed as instructions on a machine, where the instructions are included on one or more computer readable mediums or one or more non-transitory machine readable storage mediums. The V2X UE can comprise one or more processors and memory configured to: process, by a vehicle-to-anything (V2X) user equipment (UE), for transmitting to a V2X function a V2X service registration request having one or more parameters to confirm and authorize the registration request, as in block 1210. The V2X UE can comprise one or more processors and memory configured to: process a V2X service registration authorization response and V2X operation parameters, received from the V2X function, for permitting the V2X UE to operate in one of a plurality of V2X operation modes, as in block 1220. The V2X UE can comprise one or more processors and memory configured to: operate in either a V2X cooperative mode or a V2X listen-only mode, wherein the V2X cooperative mode permits the V2X UE and one or more alternative V2X UEs to transmit and receive cooperative awareness messages (BSM), and the V2X listen-only mode permits the V2X UE and one or more alternative V2X UEs to listen to a cooperative awareness messages (BSM), as in block 1230.

In one aspect, the functionality of 1000, 1100, and/or 1200 can include one or more of the following. In one aspect, a V2X enabled UE (e.g., V2X UE) can send a registration request to a V2X ProSe Function, which may forward the request to other V2X ProSe Functions and/or external servers for authorization of the requesting UE. The V2X UE can send a V2X registration request message containing any combination of the following parameters: a PSID, a V2X operation mode, a V2X cooperative transmission rate, and/or a certificate request. The V2X ProSe function can be a V2X specific functionality that is implemented as part of the ProSe function. The V2X ProSe function can be is a V2X specific functionality that is implemented as a standalone function. The V2X ProSe function can send a registration response to the V2X UE including the V2X operation parameters that the UE is allowed to use, which include UETempID, V2X mode, V2X cooperative transmission rate and certificate response.

In one aspect, the V2X ProSe function can notify one or more external servers that one or more V2X UEs have been registered by sending a registration notification message. The V2X ProSe function can configure the V2X UE to operate in one of two modes: 1) a cooperative mode—the UE can transmit and listen to safety messages), and 2) a listen-only mode—the UE can only listen to other UEs' safety messages). The safety messages can be basic safety messages (BSM) or other messages defined according to the SAE J2735 standard, as well as cooperative awareness messages (CAM) or decentralized environmental notification messages (DENM) defined according other telecommunication standards. The V2X UE can send a request to the V2X ProSe function to update the V2X operation mode of the V2X UE and wait for a response. If authorized by the V2X ProSe function, the V2X UE can start operation in the new mode. The V2X UE can send a request to the V2X ProSe function to update the V2X cooperative transmission rate of the V2X UE and wait for a response. If authorized by the V2X ProSe function, the V2X UE can start operation with the new transmission rate.

In one aspect, V2X enabled UEs can exchange safety messages (e.g. BSM, CAM, DENM) over a PC5 interface. V2X UEs can add V2X header to the V2X messages over PC5 including the UETempID and a PSID, which identifies the services supported at the V2X application layer.

Figure 13:
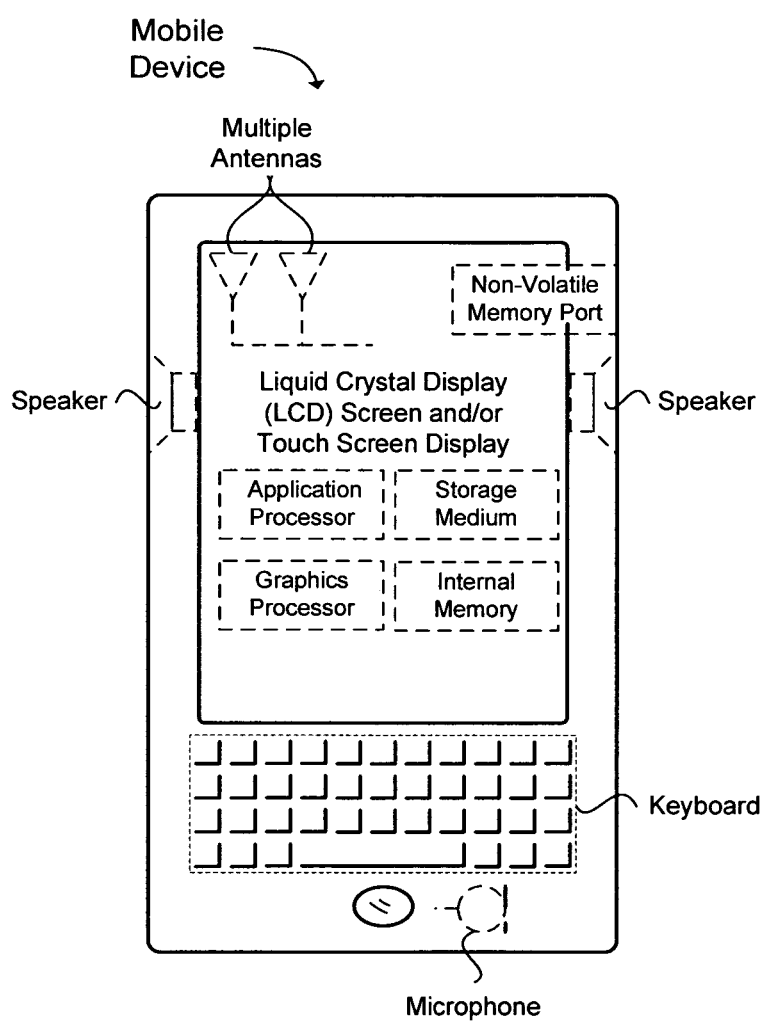
FIG. 13 illustrates a diagram of example components of a wireless device (e.g. User Equipment "UE") device in accordance with an example.

FIG. 13 illustrates a diagram of a wireless device (e.g., UE) in accordance with an example. FIG. 13 provides an example illustration of the wireless device, such as a user equipment (UE) or V2X UE, a mobile station (MS), a mobile wireless device, a mobile communication device, a tablet, a handset, or other type of wireless device. In one aspect, the wireless device can include at least one of an antenna, a touch sensitive display screen, a speaker, a microphone, a graphics processor, a baseband processor, an application processor, internal memory, a non-volatile memory port, and combinations thereof.

The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The mobile device can include a storage medium. In one aspect, the storage medium can be associated with and/or communicate with the application processor, the graphics processor, the display, the non-volatile memory port, and/or internal memory. In one aspect, the application processor and graphics processor are storage mediums.

Figure 14:
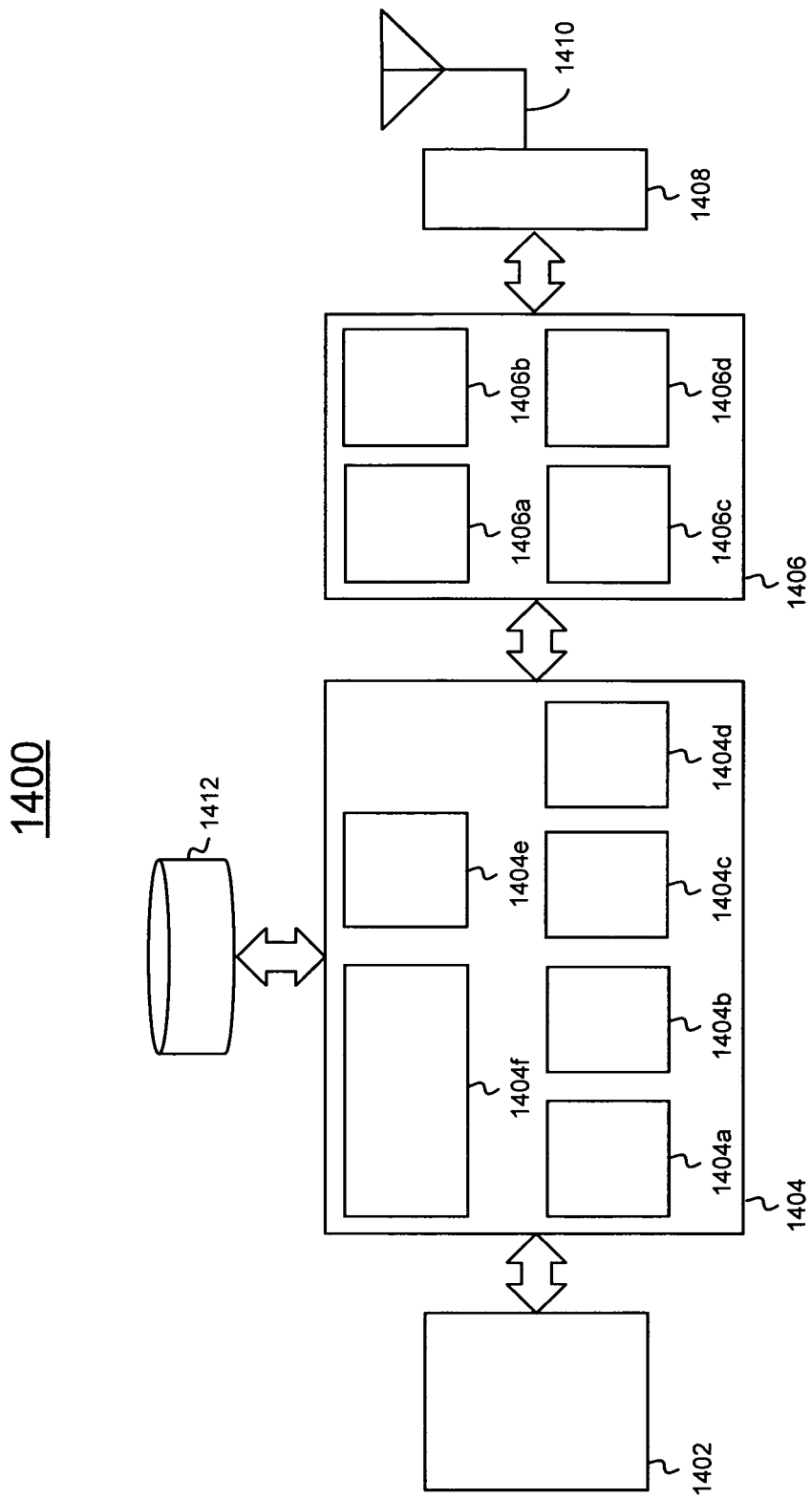
FIG. 14 illustrates a diagram of example components of a User Equipment (UE) device in accordance with an example.

FIG. 14 illustrates a diagram of example components of a User Equipment (UE) device in accordance with an example. FIG. 14 illustrates, for one aspect, example components of a User Equipment (UE) device 1400. In some aspects, the UE device 1400 can include application circuitry 1402, baseband circuitry 1404, Radio Frequency (RF) circuitry 1406, front-end module (FEM) circuitry 1408 and one or more antennas 1410, coupled together at least as shown.

The application circuitry 1402 can include one or more application processors. For example, the application circuitry 1402 can include circuitry such as, but not limited to, one or more single-core or multi-core processors. The processor(s) can include any combination of general-purpose processors and dedicated processors (e.g., graphics processors, application processors, etc.). The processors can be coupled with and/or can include memory/storage and can be configured to execute instructions stored in the memory/storage to enable various applications and/or operating systems to run on the system.

The processor(s) can include any combination of general-purpose processors and dedicated processors (e.g., graphics processors, application processors, etc.). The processors can be coupled with and/or can include a storage medium 1412, and can be configured to execute instructions stored in the storage medium 1412 to enable various applications and/or operating systems to run on the system.

The baseband circuitry 1404 can include circuitry such as, but not limited to, one or more single-core or multi-core processors. The baseband circuitry 1404 can include one or more baseband processors and/or control logic to process baseband signals received from a receive signal path of the RF circuitry 1406 and to generate baseband signals for a transmit signal path of the RF circuitry 1406. Baseband processing circuitry 1404 can interface with the application circuitry 1402 for generation and processing of the baseband signals and for controlling operations of the RF circuitry 1406. For example, in some aspects, the baseband circuitry 1404 can include a second generation (2G) baseband processor 1404a, third generation (3G) baseband processor 1404b, fourth generation (4G) baseband processor 1404c, and/or other baseband processor(s) 1404d for other existing generations, generations in development or to be developed in the future (e.g., fifth generation (5G), 6G, etc.). The baseband circuitry 1404 (e.g., one or more of baseband processors 1404a-d) can handle various radio control functions that enable communication with one or more radio networks via the RF circuitry 1406. The radio control functions can include, but are not limited to, signal modulation/demodulation, encoding/decoding, radio frequency shifting, etc. In some aspects, modulation/demodulation circuitry of the baseband circuitry 1404 can include Fast-Fourier Transform (FFT), precoding, and/or constellation mapping/demapping functionality. In some aspects, encoding/decoding circuitry of the baseband circuitry 1404 can include convolution, tail-biting convolution, turbo, Viterbi, and/or Low Density Parity Check (LDPC) encoder/decoder functionality. Aspects of modulation/demodulation and encoder/decoder functionality are not limited to these examples and can include other suitable functionality in other aspects.

In some aspects, the baseband circuitry 1404 can include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1404e of the baseband circuitry 1404 can be configured to run elements of the protocol stack for signaling of the PHY, MAC, RLC, PDCP and/or RRC layers. In some aspects, the baseband circuitry can include one or more audio digital signal processor(s) (DSP) 1404f. The audio DSP(s) 1404f can be include elements for compression/decompression and echo cancellation and can include other suitable processing elements in other aspects. Components of the baseband circuitry can be suitably combined in a single chip, a single chipset, or disposed on a same circuit board in some aspects. In some aspects, some or all of the constituent components of the baseband circuitry 1404 and the application circuitry 1402 can be implemented together such as, for example, on a system on a chip (SOC).

In some aspects, the baseband circuitry 1404 can provide for communication compatible with one or more radio technologies. For example, in some aspects, the baseband circuitry 1404 can support communication with an evolved universal terrestrial radio access network (EUTRAN) and/or other wireless metropolitan area networks (WMAN), a wireless local area network (WLAN), a wireless personal area network (WPAN). Aspects in which the baseband circuitry 1404 is configured to support radio communications of more than one wireless protocol can be referred to as multi-mode baseband circuitry.

RF circuitry 1406 can enable communication with wireless networks using modulated electromagnetic radiation through a non-solid medium. In various aspects, the RF circuitry 1406 can include switches, filters, amplifiers, etc. to facilitate the communication with the wireless network. RF circuitry 1406 can include a receive signal path which can include circuitry to down-convert RF signals received from the FEM circuitry 1408 and provide baseband signals to the baseband circuitry 1404. RF circuitry 1406 can also include a transmit signal path which can include circuitry to up-convert baseband signals provided by the baseband circuitry 1404 and provide RF output signals to the FEM circuitry 1408 for transmission.

In some aspects, the RF circuitry 1406 can include a receive signal path and a transmit signal path. The receive signal path of the RF circuitry 1406 can include mixer circuitry 1406a, amplifier circuitry 1406b and filter circuitry 1406c. The transmit signal path of the RF circuitry 1406 can include filter circuitry 1406c and mixer circuitry 1406a. RF circuitry 1406 can also include synthesizer circuitry 1406d for synthesizing a frequency for use by the mixer circuitry 1406a of the receive signal path and the transmit signal path. In some aspects, the mixer circuitry 1406a of the receive signal path can be configured to down-convert RF signals received from the FEM circuitry 1408 based on the synthesized frequency provided by synthesizer circuitry 1406d. The amplifier circuitry 1406b can be configured to amplify the down-converted signals and the filter circuitry 1406c can be a low-pass filter (LPF) or band-pass filter (BPF) configured to remove unwanted signals from the down-converted signals to generate output baseband signals. Output baseband signals can be provided to the baseband circuitry 1404 for further processing. In some aspects, the output baseband signals can be zero-frequency baseband signals, although the output baseband signals do not have to be zero-frequency baseband signals. In some aspects, mixer circuitry 1406a of the receive signal path can comprise passive mixers, although the scope of the aspects is not limited in this respect.

In some aspects, the mixer circuitry 1406a of the transmit signal path can be configured to up-convert input baseband signals based on the synthesized frequency provided by the synthesizer circuitry 1406d to generate RF output signals for the FEM circuitry 1408. The baseband signals can be provided by the baseband circuitry 1404 and can be filtered by filter circuitry 1406c. The filter circuitry 1406c can include a low-pass filter (LPF), although the scope of the aspects is not limited in this respect.

In some aspects, the mixer circuitry 1406a of the receive signal path and the mixer circuitry 1406a of the transmit signal path can include two or more mixers and can be arranged for quadrature downconversion and/or upconversion respectively. In some aspects, the mixer circuitry 1406a of the receive signal path and the mixer circuitry 1406a of the transmit signal path can include two or more mixers and can be arranged for image rejection (e.g., Hartley image rejection). In some aspects, the mixer circuitry 1406a of the receive signal path and the mixer circuitry 1406a can be arranged for direct downconversion and/or direct upconversion, respectively. In some aspects, the mixer circuitry 1406a of the receive signal path and the mixer circuitry 1406a of the transmit signal path can be configured for super-heterodyne operation.

In some aspects, the output baseband signals and the input baseband signals can be analog baseband signals, although the scope of the aspects is not limited in this respect. In some alternate aspects, the output baseband signals and the input baseband signals can be digital baseband signals. In these alternate aspects, the RF circuitry 1406 can include analog-to-digital converter (ADC) and digital-to-analog converter (DAC) circuitry and the baseband circuitry 1404 can include a digital baseband interface to communicate with the RF circuitry 1406.

In some dual-mode embodiments, a separate radio IC circuitry can be provided for processing signals for each spectrum, although the scope of the embodiments is not limited in this respect.

In some embodiments, the synthesizer circuitry 1406d can be a fractional-N synthesizer or a fractional N/N+1 synthesizer, although the scope of the embodiments is not limited in this respect as other types of frequency synthesizers can be suitable. For example, synthesizer circuitry 1406d can be a delta-sigma synthesizer, a frequency multiplier, or a synthesizer comprising a phase-locked loop with a frequency divider.

The synthesizer circuitry 1406d can be configured to synthesize an output frequency for use by the mixer circuitry

1406a of the RF circuitry 1406 based on a frequency input and a divider control input. In some embodiments, the synthesizer circuitry 1406d can be a fractional N/N+1 synthesizer.

In some embodiments, frequency input can be provided by a voltage controlled oscillator (VCO), although that is not a constraint. Divider control input can be provided by either the baseband circuitry 1404 or the applications processor 1402 depending on the desired output frequency. In some embodiments, a divider control input (e.g., N) can be determined from a look-up table based on a channel indicated by the applications processor 1402.

Synthesizer circuitry 1406d of the RF circuitry 1406 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1406d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 1406 can include an IQ/polar converter.

FEM circuitry 1408 can include a receive signal path which can include circuitry configured to operate on RF signals received from one or more antennas 1410, amplify the received signals and provide the amplified versions of the received signals to the RF circuitry 1406 for further processing. FEM circuitry 1408 can also include a transmit signal path which can include circuitry configured to amplify signals for transmission provided by the RF circuitry 1406 for transmission by one or more of the one or more antennas 1410.

In some embodiments, the FEM circuitry 1408 can include a TX/RX switch to switch between transmit mode and receive mode operation. The FEM circuitry can include a receive signal path and a transmit signal path. The receive signal path of the FEM circuitry can include a low-noise amplifier (LNA) to amplify received RF signals and provide the amplified received RF signals as an output (e.g., to the RF circuitry 1406). The transmit signal path of the FEM circuitry 1408 can include a power amplifier (PA) to amplify input RF signals (e.g., provided by RF circuitry 1406), and one or more filters to generate RF signals for subsequent transmission (e.g., by one or more of the one or more antennas 1410.

In some embodiments, the UE device 1400 can include additional elements such as, for example, memory/storage, display, camera, sensor, and/or input/output (I/O) interface.

Figure 15:
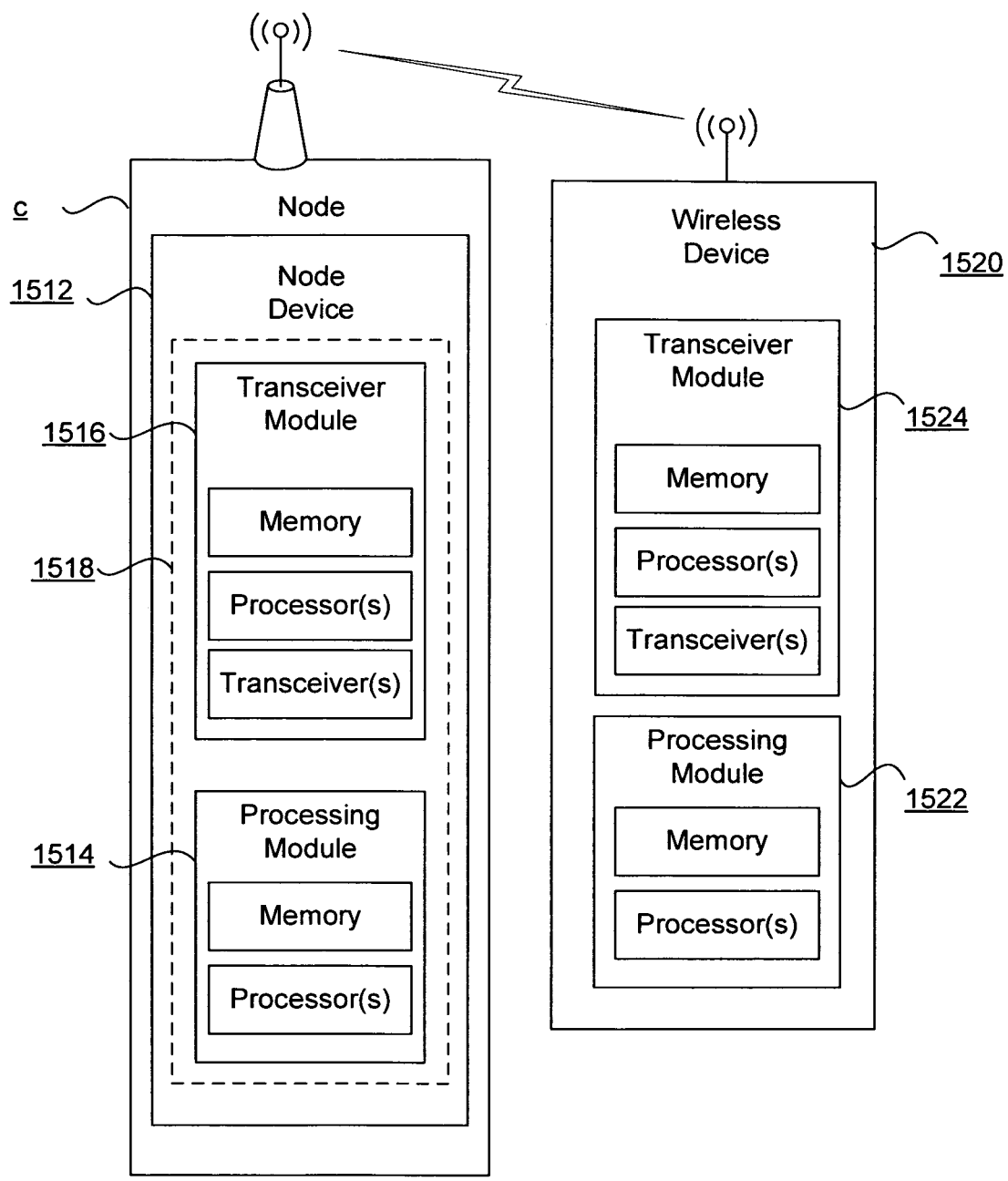
FIG. 15 illustrates a diagram of a node (e.g., eNB) and wireless device (e.g., UE) in accordance with an example.

FIG. 15 illustrates a diagram 1500 of a node 1510 (e.g., eNB and/or a Serving GPRS Support Node) and wireless device (e.g., UE) in accordance with an example. The node can include a base station (BS), a Node B (NB), an evolved Node B (eNB), a baseband unit (BBU), a remote radio head (RRH), a remote radio equipment (RRE), a remote radio unit (RRU), or a central processing module (CPM). In one aspect, the node can be a Serving GPRS Support Node. The node 1510 can include a node device 1512. The node device 1512 or the node 1510 can be configured to communicate with the wireless device 1520. The node device 1512 can be configured to implement the technology described. The node device 1512 can include a processing module 1514 and a transceiver module 1516. In one aspect, the node device 1512 can include the transceiver module 1516 and the processing module 1514 forming a circuitry 1518 for the node 1510. In one aspect, the transceiver module 1516 and the processing module 1514 can form a circuitry of the node device 1512. The processing module 1514 can include one or more processors and memory. In one embodiment, the processing module 1522 can include one or more application processors. The transceiver module 1516 can include a transceiver and one or more processors and memory. In one embodiment, the transceiver module 1516 can include a baseband processor.

The wireless device 1520 can include a transceiver module 1524 and a processing module 1522. The processing module 1522 can include one or more processors and memory. In one embodiment, the processing module 1522 can include one or more application processors. The transceiver module 1524 can include a transceiver and one or more processors and memory. In one embodiment, the transceiver module 1524 can include a baseband processor. The wireless device 1520 can be configured to implement the technology described. The node 1510 and the wireless devices 1520 can also include one or more storage mediums, such as the transceiver module 1516, 1524 and/or the processing module 1514, 1522.

EXAMPLES

The following examples pertain to specific technology embodiments and point out specific features, elements, or steps that can be used or otherwise combined in achieving such embodiments.

Example 1 includes apparatus of a vehicle-to-anything (V2X) user equipment (UE) to perform V2X communication within a wireless communication network, the apparatus comprising one or more processors and memory configured to: process, by the V2X UE, for transmission to a V2X function a V2X service registration request having one or more parameters to confirm and authorize the V2X service registration request; process a V2X service registration authorization response and V2X operation parameters, that is received by from the V2X function, for permitting the V2X UE to operate in one of a plurality of V2X operation modes; and operate in the one of the plurality of V2X operation modes using the V2X operation parameters.

Example 2 includes the apparatus of example 1, further configured to send, by the V2X UE, to the V2X function the V2X service registration request to enable the V2X function to forward to the V2X service registration request to one or more additional V2X functions.

Example 3 includes the apparatus of example 1 or 2, wherein the V2X service registration request includes a provider service identifier (PSID), a V2X operation mode, a V2X cooperative transmission rate, a certificate request, or a combination thereof.

Example 4 includes the apparatus of example 1 or 2, wherein the V2X service registration request response includes a V2X UE temporary identification (V2X UETempID) provider service identifier (PSID), a V2X operation mode, a V2X cooperative transmission rate, a certificate request, or a combination thereof.

Example 5 includes the apparatus of example 1, wherein the plurality of V2X operation modes includes a V2X cooperative mode and a V2X listen-only mode.

Example 6 includes the apparatus of example 5, wherein the V2X cooperative mode permits the V2X UE and one or more alternative V2X UEs to transmit and receive cooperative awareness messages (BSM), wherein the V2X cooperative mode is a default mode and allows the V2X UE and one or more alternative V2X UEs to discover each other.

Example 7 includes the apparatus of example 5, wherein the V2X listen-only mode permits the V2X UE and one or more alternative V2X UEs to listen to a cooperative awareness messages (BSM).

Example 8 includes the apparatus of example 1, further configured to process a V2X service update request by the V2X UE for transmission to the V2X function to update the one of the plurality of V2X operation modes.

Example 9 includes the apparatus of example 1 or 8, further configured to process a V2X service update request response, received from the V2X function, to update the one of the plurality of V2X operation.

Example 10 includes the apparatus of example 1 or 8, further configured to operate in an updated V2X operation mode.

Example 11 includes the apparatus of example 1, further configured to process, for transmission by the V2X UE to the V2X function, a request to update a V2X cooperative transmission rate.

Example 12 includes the apparatus of example 1 or 11, further configured to process a response received from the V2X function to update a V2X cooperative transmission rate.

Example 13 includes the apparatus of example 1, further configured to operate in an updated V2X cooperative transmission rate.

Example 14 includes the apparatus of example 1, further configured to exchange V2X safety messages between the V2X UE and one or more alternative V2X UEs over a PC5 interface.

Example 15 includes the apparatus of example 14, further configured to add a V2X header to V2X safety messages having a V2X UE temporary identification (V2X UETempID) and a provider service identifier (PSID), the PSID identifies services supported at a V2X application layer.

Example 16 includes the apparatus of example 1, wherein the vehicle-to-anything (V2X) communication is a vehicle-to-vehicle communication, vehicle-to-person communication, or vehicle-to-network communication.

Example 17 includes the apparatus of example 1 or 16, wherein the V2X UE is a roadside unit (RSU).

Example 18 includes an apparatus of a vehicle-to-anything (V2X) function to perform V2X communication with a V2X user equipment (UE) within a wireless communication network, the apparatus comprising one or more processors and memory configured to: receive, from the V2X UE, a V2X service registration request having one or more parameters to confirm and authorize the V2X service registration request; forward to the V2X service registration request to one or more additional V2X functions; and send, to the V2X UE, a V2X service registration authorization response and V2X operation parameters to allow the V2X UE to operate in one of a plurality of V2X operation modes.

Example 19 includes the apparatus of example 18, wherein the V2X service registration request includes a provider service identifier (PSID), a V2X operation mode, a V2X cooperative transmission rate, and a certificate request.

Example 20 includes the apparatus of example 18 or 19, wherein the V2X service registration request response includes a V2X UE temporary identification (V2X UETempID) provider service identifier (PSID), a V2X operation mode, a V2X cooperative transmission rate, a certificate request, or a combination thereof.

Example 21 includes the apparatus of example 18, wherein the plurality of V2X operation modes include V2X cooperative mode and a V2X listen-only mode, wherein the V2X cooperative mode permits the V2X UE and one or more alternative V2X UEs to transmit and receive cooperative awareness messages (BSM), and wherein the V2X listen-only mode permits the V2X UE and one or more alternative V2X UEs to listen to cooperative awareness messages (BSM).

Example 22 includes the apparatus of example 18, further configured to process a V2X service update request, received by the V2X UE, to update the one of the plurality of V2X operation modes.

Example 23 includes the apparatus of example 18 or 22, further configured to process, for transmission to the V2X function, a V2X service update request response to update the one of the plurality of V2X operation to enable the V2X UE to operate in an updated V2X operation mode.

Example 24 includes the apparatus of example 18, further configured to process a request received by the V2X UE to update a V2X cooperative transmission rate.

Example 25 includes the apparatus of example 18 or 24, further configured to process, for transmitting to the V2X function, a response to update a V2X cooperative transmission rate to enable the V2X UE to operate in an updated V2X cooperative transmission rate.

Example 26 includes the apparatus of example 18, further configured to provide, to the V2X UE, configurable parameters to configure a V2X message cooperative transmission rate according to a provided service and Quality of Service (QoS) priorities associated with the V2X UE.

Example 27 includes the apparatus of example 14, further configured to add a V2X header to V2X safety messages having a V2X UE temporary identification (V2X UETempID), a provider service identifier (PSID), the PSID identifies services supported at a V2X application layer.

Example 28 includes the apparatus of example 1, wherein the vehicle-to-anything (V2X) communication is a vehicle-to-vehicle communication, vehicle-to-person communication, or vehicle-to-network communication.

Example 30 includes at least one machine readable storage medium having instructions embodied thereon for a vehicle-to-anything (V2X) a user equipment (UE) to perform V2X communication within a wireless communication network, the instructions when executed by one or more processors and memory perform the following: send, by the V2X UE, to a V2X function a V2X service registration request having one or more parameters to confirm and authorize the registration request; process a V2X service registration authorization response and V2X operation parameters, received by from the V2X function, for permitting the V2X UE to operate in one of a plurality of V2X operation modes; and operate in either a V2X cooperative mode or a V2X listen-only mode, wherein the V2X cooperative mode permits the V2X UE and one or more alternative V2X UEs to transmit and receive cooperative awareness messages (BSM), and the V2X listen-only mode permits the V2X UE and one or more alternative V2X UEs to listen to a cooperative awareness messages (BSM).

Example 31 includes the least one machine readable storage medium of example 29, wherein the V2X cooperative mode is a default mode and allows the V2X UE and one or more alternative V2X UEs to discover each other.

Example 32 includes an apparatus of a vehicle-to-anything (V2X) user equipment (UE) to perform V2X communication within a wireless communication network, the apparatus comprising one or more processors and memory configured to: send, by the V2X UE, to a V2X function a V2X service registration request having one or more parameters to confirm and authorize the V2X service registration request; process a V2X service registration authorization response and V2X operation parameters, received by from the V2X function, for permitting the V2X UE to operate in one of a plurality of V2X operation modes; and operate in the one of the plurality of V2X operation modes using the V2X operation parameters.

Example 33 includes the apparatus of example 31, further configured to send, by the V2X UE, to the V2X function the V2X service registration request to enable the V2X function to forward to the V2X service registration request to one or more additional V2X functions.

Example 34 includes the apparatus of example 31, wherein the V2X service registration request includes a provider service identifier (PSID), a V2X operation mode, a V2X cooperative transmission rate, a certificate request, or a combination thereof.

Example 35 includes the apparatus of example 31, wherein the V2X service registration request response includes a V2X UE temporary identification (V2X UETempID) provider service identifier (PSID), a V2X operation mode, a V2X cooperative transmission rate, a certificate request, or a combination thereof.

Example 36 includes the apparatus of example 31, wherein the plurality of V2X operation modes includes a V2X cooperative mode and a V2X listen-only mode.

Example 37 includes the apparatus of example 34, wherein the V2X cooperative mode permits the V2X UE and one or more alternative V2X UEs to transmit and receive V2X safety messages, wherein the V2X cooperative mode is a default mode and allows the V2X UE and one or more alternative V2X UEs to discover each other.

Example 38 includes the apparatus of example 35, wherein the V2X listen-only mode permits the V2X UE and one or more alternative V2X UEs to listen to a V2X safety message.

Example 39 includes the apparatus of example 31, further configured to process a V2X service update request by the V2X UE for transmission to the V2X function to update the one of the plurality of V2X operation modes.

Example 40 includes the apparatus of example 31, further configured to process a V2X service update request response, received from the V2X function, to update the one of the plurality of V2X operation.

Example 41 includes the apparatus of example 31, further configured to operate in an updated V2X operation mode.

Example 42 includes the apparatus of example 31, further configured to process, for transmission by the V2X UE to the V2X function, a request to update a V2X cooperative transmission rate.

Example 43 includes the apparatus of example 31, further configured to process a response received from the V2X function to update a V2X cooperative transmission rate.

Example 44 includes the apparatus of example 31, further configured to operate in an updated V2X cooperative transmission rate.

Example 45 includes the apparatus of example 31, further configured to exchange V2X safety messages between the V2X UE and one or more alternative V2X UEs over a device-to-device interface.

Example 46 includes the apparatus of example 43, further configured to add a V2X header to V2X safety messages having a V2X UE temporary identification (V2X UETempID) and a provider service identifier (PSID), the PSID identifies services supported at a V2X application layer.

Example 47 includes the apparatus of example 31, wherein the vehicle-to-anything (V2X) communication is a vehicle-to-vehicle communication, vehicle-to-person communication, or vehicle-to-network communication, wherein V2X communication includes vehicle to anything (V2I), wherein the anything includes a road side unit (RSU) that is implemented in a cellular base station.

Example 48 includes the apparatus of example 31, wherein the V2X UE is a roadside unit (RSU) and includes an onboard unit (OBU).

Example 49 includes an apparatus of a vehicle-to-anything (V2X) function to perform V2X communication with a V2X user equipment (UE) within a wireless communication network, the apparatus comprising one or more processors and memory configured to: receive, from the V2X UE, a V2X service registration request having one or more parameters to confirm and authorize the V2X service registration request; process, for forwarding, the V2X service registration request to one or more additional V2X functions or external application servers; and send, to the V2X UE, a V2X service registration authorization response and V2X operation parameters to allow the V2X UE to operate in one of a plurality of V2X operation modes.

Example 50 includes the apparatus of example 49, wherein the V2X service registration request includes a provider service identifier (PSID), a V2X operation mode, a V2X cooperative transmission rate, and a certificate request, wherein all or at least a portion of the V2X function can be implemented by an authorized UE.

Example 51 includes the apparatus of example 49, wherein the V2X service registration request response includes a V2X UE temporary identification (V2X UETempID) provider service identifier (PSID), a V2X operation mode, a V2X cooperative transmission rate, a certificate request, or a combination thereof.

Example 52 includes the apparatus of example 49, wherein the plurality of V2X operation modes include V2X cooperative mode and a V2X listen-only mode, wherein the V2X cooperative mode permits the V2X UE and one or more alternative V2X UEs to transmit and receive V2X safety messages, and wherein the V2X listen-only mode permits the V2X UE and one or more alternative V2X UEs to listen to a V2X safety message.

Example 53 includes the apparatus of example 49, further configured to process a V2X service update request, received by the V2X UE, to update the one of the plurality of V2X operation modes.

Example 54 includes the apparatus of example 49, further configured to process, for transmission to the V2X function, a V2X service update request response to update the one of the plurality of V2X operation to enable the V2X UE to operate in an updated V2X operation mode.

Example 55 includes the apparatus of example 49, further configured to process a request received by the V2X UE to update a V2X cooperative transmission rate.

Example 56 includes the apparatus of example 49, further configured to process, for transmitting to the V2X function, a response to update a V2X cooperative transmission rate to enable the V2X UE to operate in an updated V2X cooperative transmission rate.

Example 57 includes the apparatus of example 49, further configured to provide, to the V2X UE, configurable parameters to configure a V2X message cooperative transmission rate according to a provided service and Quality of Service (QoS) priorities associated with the V2X UE.

Example 58 includes the apparatus of example 49, further configured to add a V2X header to V2X safety messages having a V2X UE temporary identification (V2X UETempID), a provider service identifier (PSID), the PSID identifies services supported at a V2X application layer.

Example 59 includes the apparatus of example 49, wherein the vehicle-to-anything (V2X) communication is a vehicle-to-vehicle communication, vehicle-to-person communication, or vehicle-to-network communication.

Example 60 includes at least one or more transitory or non-transitory machine readable storage mediums having instructions embodied thereon for a vehicle-to-anything (V2X) a user equipment (UE) to perform V2X communication within a wireless communication network, the instructions when executed by one or more processors and memory perform the following: send, by the V2X UE, to a V2X function a V2X service registration request having one or more parameters to confirm and authorize the registration request; process a V2X service registration authorization response and V2X operation parameters, received by from the V2X function, for permitting the V2X UE to operate in one of a plurality of V2X operation modes; and operate in either a V2X cooperative mode or a V2X listen-only mode, wherein the V2X cooperative mode permits the V2X UE and one or more alternative V2X UEs to transmit and receive V2X safety messages, and the V2X listen-only mode permits the V2X UE and one or more alternative V2X UEs to listen to a V2X safety message.

Example 61 includes the one or more transitory or non-transitory machine readable storage mediums of example 60, wherein the V2X cooperative mode is a default mode and allows the V2X UE and one or more alternative V2X UEs to discover each other.

Example 62 includes a device for vehicle-to-anything (V2X) communication within a wireless communication network, the device comprising: means for sending, by the V2X UE, to a V2X function a V2X service registration request having one or more parameters to confirm and authorize the registration request; means for receiving, from the V2X function, a V2X service registration authorization response and V2X operation parameters for permitting the V2X UE to operate in one of a plurality of V2X operation modes; and means for operating in either a V2X cooperative mode or a V2X listen-only mode, wherein the V2X cooperative mode permits the V2X UE and one or more alternative V2X UEs to transmit and receive V2X safety messages, and the V2X listen-only mode permits the V2X UE and one or more alternative V2X UEs to listen to a V2X safety message.

Example 63 includes the device of example 62, wherein the V2X cooperative mode is a default mode and allows the V2X UE and one or more alternative V2X UEs to discover each other.

Example 64 includes an apparatus of a vehicle-to-anything (V2X) user equipment (UE) to perform V2X communication within a wireless communication network, the apparatus comprising one or more processors and memory configured to: send, by the V2X UE, to a V2X function a V2X service registration request having one or more parameters to confirm and authorize the V2X service registration request; process a V2X service registration authorization response and V2X operation parameters, received by from the V2X function, for permitting the V2X UE to operate in one of a plurality of V2X operation modes; and operate in the one of the plurality of V2X operation modes using the V2X operation parameters.

Example 65 can includes the apparatus of example 64, further configured to: send, by the V2X UE, to the V2X function the V2X service registration request to enable the V2X function to forward to the V2X service registration request to one or more additional V2X functions, wherein the V2X service registration request includes a provider service identifier (PSID), a V2X operation mode, a V2X cooperative transmission rate, a certificate request, or a combination thereof, or the V2X service registration request response includes a V2X UE temporary identification (V2X UETempID) provider service identifier (PSID), a V2X operation mode, a V2X cooperative transmission rate, a certificate request, or a combination thereof, wherein the plurality of V2X operation modes include a V2X cooperative mode and a V2X listen-only mode.

Example 66 can include the apparatus of example 64 or 65, wherein the V2X cooperative mode permits the V2X UE and one or more alternative V2X UEs to transmit and receive V2X safety messages, wherein the V2X cooperative mode is a default mode and allows the V2X UE and one or more alternative V2X UEs to discover each other, wherein the V2X listen-only mode permits the V2X UE and one or more alternative V2X UEs to listen to a V2X safety message.

In Example 67, the subject matter of Example 64 or any of the Examples described herein may further configured to: process a V2X service update request by the V2X UE for transmission to the V2X function to update the one of the plurality of V2X operation modes; process a V2X service update request response, received from the V2X function, to update the one of the plurality of V2X operation; operate in an updated V2X operation mode; or process, for transmission by the V2X UE to the V2X function, a request to update a V2X cooperative transmission rate.

In Example 68, the subject matter of Example 64 or any of the Examples described herein may further configured to: process a response received from the V2X function to update a V2X cooperative transmission rate; operate in an updated V2X cooperative transmission rate; exchange V2X safety messages between the V2X UE and one or more alternative V2X UEs over a device-to-device interface; or add a V2X header to V2X safety messages having a V2X UE temporary identification (V2X UETempID) and a provider service identifier (PSID), the PSID identifies services supported at a V2X application layer.

In Example 69, the subject matter of Example 64 or any of the Examples described herein may further include, wherein the vehicle-to-anything (V2X) communication is a vehicle-to-vehicle communication, vehicle-to-person communication, or vehicle-to-network communication, wherein V2X communication includes vehicle to anything (V2I), wherein the anything includes a road side unit (RSU) that is implemented in a cellular base station, wherein the V2X UE is a roadside unit (RSU) and includes an onboard unit (OBU).

Example 70 includes an apparatus of a vehicle-to-anything (V2X) function to perform V2X communication with a V2X user equipment (UE) within a wireless communication network, the apparatus comprising one or more processors and memory configured to: receive, from the V2X UE, a V2X service registration request having one or more parameters to confirm and authorize the V2X service registration request; process, for forwarding, the V2X service registration request to one or more additional V2X functions or external application servers; and send, to the V2X UE, a V2X service registration authorization response and V2X operation parameters to allow the V2X UE to operate in one of a plurality of V2X operation modes.

Example 71 includes the apparatus of example 70, wherein the V2X service registration request includes a provider service identifier (PSID), a V2X operation mode, a V2X cooperative transmission rate, and a certificate request, wherein all or alt least a portion of the V2X function can be implemented by an authorized UE or the V2X service registration request response includes a V2X UE temporary identification (V2X UETempID) provider service identifier (PSID), a V2X operation mode, a V2X cooperative transmission rate, a certificate request, or a combination thereof.

Example 72 includes the apparatus of example 70 or 71, wherein the plurality of V2X operation modes include V2X cooperative mode and a V2X listen-only mode, wherein the V2X cooperative mode permits the V2X UE and one or more alternative V2X UEs to transmit and receive V2X safety messages, and wherein the V2X listen-only mode permits the V2X UE and one or more alternative V2X UEs to listen to a V2X safety message.

Example 73 includes the apparatus of any of the examples of 70-72, further configured to process a V2X service update request, received by the V2X UE, to update the one of the plurality of V2X operation modes.

Example 74 includes the apparatus of any of the examples of 70-73, further configured to: process, for transmission to the V2X function, a V2X service update request response to update the one of the plurality of V2X operation to enable the V2X UE to operate in an updated V2X operation mode; process a request received by the V2X UE to update a V2X cooperative transmission rate; process, for transmitting to the V2X function, a response to update a V2X cooperative transmission rate to enable the V2X UE to operate in an updated V2X cooperative transmission rate; or provide, to the V2X UE, configurable parameters to configure a V2X message cooperative transmission rate according to a provided service and Quality of Service (QoS) priorities associated with the V2X UE.

Example 75 includes the apparatus of any of the examples of 70-74, further configured to add a V2X header to V2X safety messages having a V2X UE temporary identification (V2X UETempID), a provider service identifier (PSID), the PSID identifies services supported at a V2X application layer.

Example 76 includes the apparatus of any of the examples of 70-75, wherein the vehicle-to-anything (V2X) communication is a vehicle-to-vehicle communication, vehicle-to-person communication, or vehicle-to-network communication.

Example 77 includes one or more transitory or non-transitory machine readable storage mediums having instructions embodied thereon for a vehicle-to-anything (V2X) a user equipment (UE) to perform V2X communication within a wireless communication network, the instructions when executed by one or more processors and memory perform the following: send, by the V2X UE, to a V2X function a V2X service registration request having one or more parameters to confirm and authorize the registration request; process a V2X service registration authorization response and V2X operation parameters, received by from the V2X function, for permitting the V2X UE to operate in one of a plurality of V2X operation modes; and operate in either a V2X cooperative mode or a V2X listen-only mode, wherein the V2X cooperative mode permits the V2X UE and one or more alternative V2X UEs to transmit and receive V2X safety messages, and the V2X listen-only mode permits the V2X UE and one or more alternative V2X UEs to listen to a V2X safety message.

Example 78 includes the one or more transitory or non-transitory machine readable storage mediums of example 77, wherein the V2X cooperative mode is a default mode and allows the V2X UE and one or more alternative V2X UEs to discover each other.

Example 79 includes a device for vehicle-to-anything (V2X) communication within a wireless communication network, the device comprising: means for sending, by the V2X UE, to a V2X function a V2X service registration request having one or more parameters to confirm and authorize the registration request; means for receiving, from the V2X function, a V2X service registration authorization response and V2X operation parameters for permitting the V2X UE to operate in one of a plurality of V2X operation modes; and means for operating in either a V2X cooperative mode or a V2X listen-only mode, wherein the V2X cooperative mode permits the V2X UE and one or more alternative V2X UEs to transmit and receive V2X safety messages, and the V2X listen-only mode permits the V2X UE and one or more alternative V2X UEs to listen to a V2X safety message.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some aspects, the circuitry can be implemented in, or functions associated with the circuitry can be implemented by, one or more software or firmware modules. In some aspects, circuitry can include logic, at least partially operable in hardware.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of a vehicle-to-anything (V2X) user equipment (UE) to perform V2X communication within a wireless communication network, the apparatus comprising one or more processors and memory configured to:
   process, by the V2X UE, for transmission to a V2X function a V2X service registration request having one or more parameters to confirm and authorize the V2X service registration request;
   process a V2X service registration authorization response and V2X operation parameters, received by from the V2X function, for permitting the V2X UE to operate in one of a plurality of V2X operation modes; and
   operate in the one of the plurality of V2X operation modes using the V2X operation parameters, wherein the plurality of V2X operation modes include a V2X cooperative mode related to a communication of V2X safety messages and a V2X listen-only mode related to V2X UE discovery, wherein the V2X cooperative mode permits the V2X UE and one or more alternative V2X UEs to transmit and receive the V2X safety messages, and the V2X cooperative mode permits allows discovery between the V2X UE and the one or more alternative V2X UEs.

2. The apparatus of claim 1, further configured to send, by the V2X UE, to the V2X function the V2X service registration request to enable the V2X function to forward to the V2X service registration request to one or more additional V2X functions.

3. The apparatus of claim 1, wherein the V2X service registration request includes a provider service identifier (PSID), a V2X operation mode, a V2X cooperative transmission rate, a certificate request, or a combination thereof.

4. The apparatus of claim 1, wherein the V2X service registration request response includes a V2X UE temporary identification (V2X UETempID) provider service identifier (PSID), a V2X operation mode, a V2X cooperative transmission rate, a certificate request, or a combination thereof.

5. The apparatus of claim 4, further configured to add a V2X header to V2X safety messages having a V2X UE temporary identification (V2X UETempID) and a provider service identifier (PSID), the PSID identifies services supported at a V2X application layer.

6. The apparatus of claim 1, wherein the V2X cooperative mode is a default mode.

7. The apparatus of claim 1, wherein the V2X listen-only mode permits the V2X UE and one or more alternative V2X UEs to listen to a V2X safety message.

8. The apparatus of claim 1, further configured to process a V2X service update request by the V2X UE for transmission to the V2X function to update the one of the plurality of V2X operation modes.

9. The apparatus of claim 1, further configured to process a V2X service update request response, received from the V2X function, to update the one of the plurality of V2X operation.

10. The apparatus of claim 1, further configured to operate in an updated V2X operation mode.

11. The apparatus of claim 1, further configured to process, for transmission by the V2X UE to the V2X function, a request to update a V2X cooperative transmission rate.

12. The apparatus of claim 1, further configured to process a response received from the V2X function to update a V2X cooperative transmission rate.

13. The apparatus of claim 1, further configured to operate in an updated V2X cooperative transmission rate.

14. The apparatus of claim 1, further configured to exchange V2X safety messages between the V2X UE and one or more alternative V2X UEs over a device-to-device interface.

15. The apparatus of claim 1, wherein the vehicle-to-anything (V2X) communication is a vehicle-to-vehicle communication, vehicle-to-person communication, or vehicle-to-network communication, wherein V2X communication includes vehicle to anything (V2I), wherein the anything includes a road side unit (RSU) that is implemented in a cellular base station.

16. The apparatus of claim 1, wherein the V2X UE is a roadside unit (RSU) and includes an onboard unit (OBU).

17. The apparatus of claim 1, wherein the vehicle-to-anything (V2X) communication is a vehicle-to-vehicle communication, vehicle-to-person communication, or vehicle-to-network communication.

* * * * *